(12) United States Patent
David et al.

(10) Patent No.: US 11,392,614 B2
(45) Date of Patent: Jul. 19, 2022

(54) TECHNIQUES FOR PERFORMING OFFLOAD COPY OPERATIONS

(71) Applicant: EMC IP Holding Company LLC, Hopkinton, MA (US)

(72) Inventors: Bar David, Rishon Lezion (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 143 days.

(21) Appl. No.: 16/743,019

(22) Filed: Jan. 15, 2020

(65) Prior Publication Data
US 2021/0216569 A1  Jul. 15, 2021

(51) Int. Cl.
G06F 16/00 (2019.01)
G06F 16/27 (2019.01)
G06F 16/23 (2019.01)
G06F 9/30 (2018.01)
G06F 16/16 (2019.01)
G06F 16/22 (2019.01)

(52) U.S. Cl.
CPC .......... *G06F 16/27* (2019.01); *G06F 9/30047* (2013.01); *G06F 16/164* (2019.01); *G06F 16/2246* (2019.01); *G06F 16/2358* (2019.01)

(58) Field of Classification Search
None
See application file for complete search history.

(56) References Cited

U.S. PATENT DOCUMENTS

| | | | | |
|---|---|---|---|---|
| 7,725,446 B2* | 5/2010 | Huras | ...................... | G06F 9/466 707/703 |
| 7,769,843 B2* | 8/2010 | Neuse | ................ | G06Q 30/0283 705/400 |
| 8,949,395 B2* | 2/2015 | Atluri | ................. | G06F 11/1453 709/223 |
| 9,356,852 B2* | 5/2016 | Neuse | ................... | H04L 41/147 |
| 9,558,232 B1 | 1/2017 | Taylor et al. | | |

(Continued)

OTHER PUBLICATIONS

Enabling Flexible Collective Communication Offload with Triggered Operations, Underwood et al., IEEE (Year: 2011).*

(Continued)

*Primary Examiner* — Jean M Corrielus
(74) *Attorney, Agent, or Firm* — Muirhead and Saturnelli, LLC

(57) ABSTRACT

Techniques for processing operations may include: receiving, at a data storage system from a host, an operation requesting to perform an offload copy operation internally within the data storage system, wherein the operation indicates that the offload copy operation copies data from a source interval to a destination interval; inserting a record in a log file logging the offload copy operation; inserting a source node representing the source interval in a source interval tree, wherein each node in the source interval tree represents a source interval of an offload copy operation having a corresponding record in the log file; inserting a destination node representing the destination interval in a destination interval tree, wherein each node in the destination interval tree represents a destination interval of an offload copy operation having a corresponding record in the log file; and returning an acknowledgement to the host regarding the offload copy operation.

17 Claims, 11 Drawing Sheets

(56) References Cited

U.S. PATENT DOCUMENTS

| | | | | |
|---|---|---|---|---|
| 9,852,151 | B1* | 12/2017 | Youngworth | G06F 3/0619 |
| 10,157,020 | B1 | 12/2018 | Taylor et al. | |
| 10,361,770 | B2* | 7/2019 | Chang | H04B 7/155 |
| 10,970,211 | B2* | 4/2021 | Davenport | G06F 12/10 |
| 2005/0229021 | A1* | 10/2005 | Lubbers | G06F 11/2069 |
| | | | | 714/2 |
| 2006/0010227 | A1 | 1/2006 | Atluri | H04L 67/1097 |
| | | | | 709/217 |
| 2009/0313503 | A1* | 12/2009 | Atluri | G06F 11/1453 |
| | | | | 714/19 |
| 2015/0006846 | A1* | 1/2015 | Youngworth | G06F 3/0619 |
| | | | | 711/216 |
| 2016/0366226 | A1* | 12/2016 | Friedman | G06F 3/0608 |
| 2017/0032013 | A1* | 2/2017 | Zheng | G06F 16/24575 |
| 2017/0052013 | A1* | 2/2017 | Tenhulzen | G01B 5/255 |
| 2021/0034520 | A1* | 2/2021 | Davenport | G06F 12/10 |

OTHER PUBLICATIONS

Microsoft, "Offloaded data transfers," Windows, http://microsoft.com/en-us/library/windows/desktop/hh848056%28v=vs.85%29.aspx, 2 Pages, Nov. 28, 2012.

Microsoft, "POPULATE_TOKEN_HEADER structure," Windows Drivers, http://msdn.microsoft.com/en-us/library/windows/hardware/hh967730%28v=vs.85%29.aspx, 2 Pages, May 17, 2013.

Microsoft, "WRITE_USING_TOKEN_HEADER structure," Windows Drivers, http://msdn.microsoft.com/en-us/library/windows/hardware/hh967746%28v=vs.85%29.aspx, 2 Pages, May 17, 2013.

Tim Curless, "EMC's Next-Generation VNX (Part 3 of 4): Symmetric Active/Active Considerations," Sep. 10, 2013.

Taylor, et al., U.S. Appl. No. 14/501,518, filed Sep. 30, 2014.

Wikipedia, "Interval tree," https://en.wikipedia.org/wiki/Interval_tree, Nov. 2019.

* cited by examiner

TECHNIQUES FOR PERFORMING OFFLOAD COPY OPERATIONS

BACKGROUND

Technical Field

This application generally relates to data storage and, more particularly, to techniques used for performing offload copy operations internally within a data storage system.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue PO operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for operations comprising: receiving, at a data storage system from a host, a first operation that is a request to perform a first offload copy operation internally within the data storage system, wherein the first operation indicates that the offload copy operation copies data from a first source interval to a first destination interval, wherein the first source interval is a source logical device and a source range of one or more logical address on the source logical device, and wherein the first destination interval is a destination logical device and a destination interval of one or more logical address on the destination logical device; inserting a first record in a log file logging the first offload copy operation; inserting a first source node representing the first source interval in a source interval tree, wherein each node in the source interval tree represents a source interval of an offload copy operation having a corresponding record in the log file; inserting a first destination node representing the first destination interval in a destination interval tree, wherein each node in the destination interval tree represents a destination interval of an offload copy operation having a corresponding record in the log file; and returning an acknowledgement to the host regarding completion of the first offload copy operation.

In at least one embodiment, processing performed may include flushing the first record of the log file, wherein said flushing may include: copying data from the first source interval to the first destination interval; updating first location metadata for the first destination interval; and removing the first destination node from the destination interval tree. Updating the first location metadata for the first destination interval may include updating first mapping information that maps the first destination interval to one or more physical storage locations and wherein second location metadata for the first source interval may include second mapping information that maps the first source interval to the one or more physical storage locations also currently mapped to the first destination interval. Flushing the first record of the log file may include: removing the first source node from the source interval tree if the first source node is not referenced by any destination node other than the first destination node. Flushing the first record of the log file may include reclaiming the first record of the log file for reuse in logging other operations in the log file.

In at least one embodiment, the log file may be stored in non-volatile memory. The source interval tree and the destination interval tree may be stored in volatile memory.

In at least one embodiment, processing performed may include: receiving, from a client, a write I/O operation that writes first data to a first target location; inserting a second record in the log file logging the write I/O operation; return a second acknowledgement to the client indicating completion of the write I/O operation; and performing first processing to flush the second record from the log file, the first processing including: determining whether the first target location overlaps with a particular source interval of a particular source node of the source interval tree; and responsive to determining the first target location overlaps with the particular source interval of the particular source node of the source interval tree, performing processing to save existing data currently stored at the first target location prior to overwriting the existing data of the first target location with the first data. The first processing to flush the second record may include reclaiming the second record of the log file for reuse in logging other operations in the log file.

In at least one embodiment, processing may include: receiving, from a client, a read I/O operation that reads from a first target location; determining that the first target location overlaps with a second destination interval of a second destination node of the destination interval tree; and responsive to determining that the first target location overlaps with the second destination interval of the second destination node of the destination interval tree, performing processing including: obtaining a second source node of the source interval tree wherein the second source node is referenced by the second destination node; determining, using the second source node, a corresponding source location in a second source interval represented by the second source node; issuing a read to read current data stored at the corresponding source location; and returning, to the client in response to the read I/O operation, the current data indicating that the current data is stored at the first target location.

In at least one embodiment, processing may include: receiving, from a client, a read I/O operation that reads from a first target location; determining that the first target location overlaps with a second destination interval of a second destination node of the destination interval tree, wherein the second destination node has a first sequence number; determining that a second record of the log file logs a write I/O operation that writes first data to the first target location, wherein the second record of the log file has a second sequence number; and responsive to determining the first sequence number is less than the second sequence number, obtaining the first data from the second record of the log file and returning the first data to the client in response to the read I/O operation.

In at least one embodiment, processing may include: responsive to determining the first sequence number is not less than the second sequence number, performing processing including: obtaining a second source node of the source interval tree wherein the second source node is referenced by the second destination node; determining, using the second source node, a corresponding source location in a second source interval represented by the second source node; issuing a read to read current data stored at the corresponding source location; and returning, to the client in response to the read I/O operation, the current data indicating that the current data is stored at the first target location.

In at least one embodiment, each record of the log file may be associated with a unique sequence number and wherein an increasing ordering of the unique sequence numbers of the records of the log file indicates the logical order in which writes logged in the records are applied to maintain write data consistency of data modified by the records of the log file. A first sequence number may be associated with the first record of the log file logging the first offload copy operation. Prior to flushing the first record of the log file, each record of the log file having an associated sequence number less that the first sequence number may be flushed. Subsequent to flushing the first record of the log file, each record of the log file have an associated sequence number greater than the first sequence number may be flushed.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
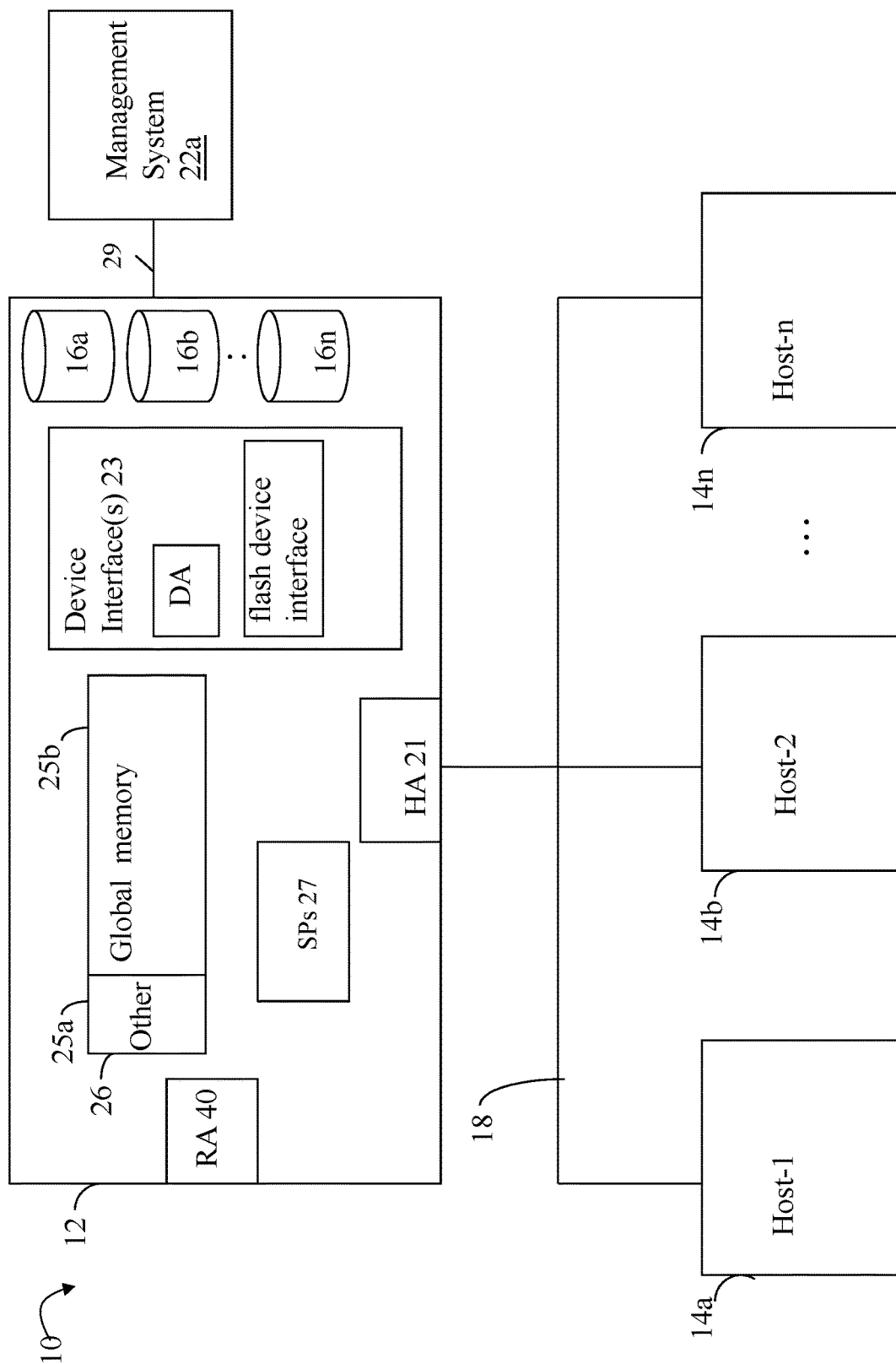
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface or controller 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface or backend device controller, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request (e.g. the read I/O path), a determination may be made as to whether all the requested read data is in cache (e.g., a cache hit where read data is stored in a data cache). If so, the read request may be characterized as a read hit, cache hit or read cache hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA, or more generally a backend physical storage device controller, retrieves the requested data from a PD and writes the retrieved read miss data (retrieved from the PD) to the cache where the HA, or more generally front end component, then retrieves the requested data from the cache to return to the requesting host.

In connection with write operations and write I/O path processing, write data received at the data storage system may be stored in cache and then written out or destaged later to physical storage, such as written to backend physical storage devices by a DA. Once the write data is written into cache, the data may be marked as dirty or write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical non-volatile storage of the back end PDs. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

Although not illustrated in FIG. 1 for simplicity, an embodiment may store additional information for cached data, such as read and write data described above that may be stored in the data cache. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16*a-n*.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the data storage system may include multiple SSD tiers of non-volatile storage where each of the SSD tiers has different characteristics that affect latency when accessing the physical storage media to read or write data.

Figure 2:
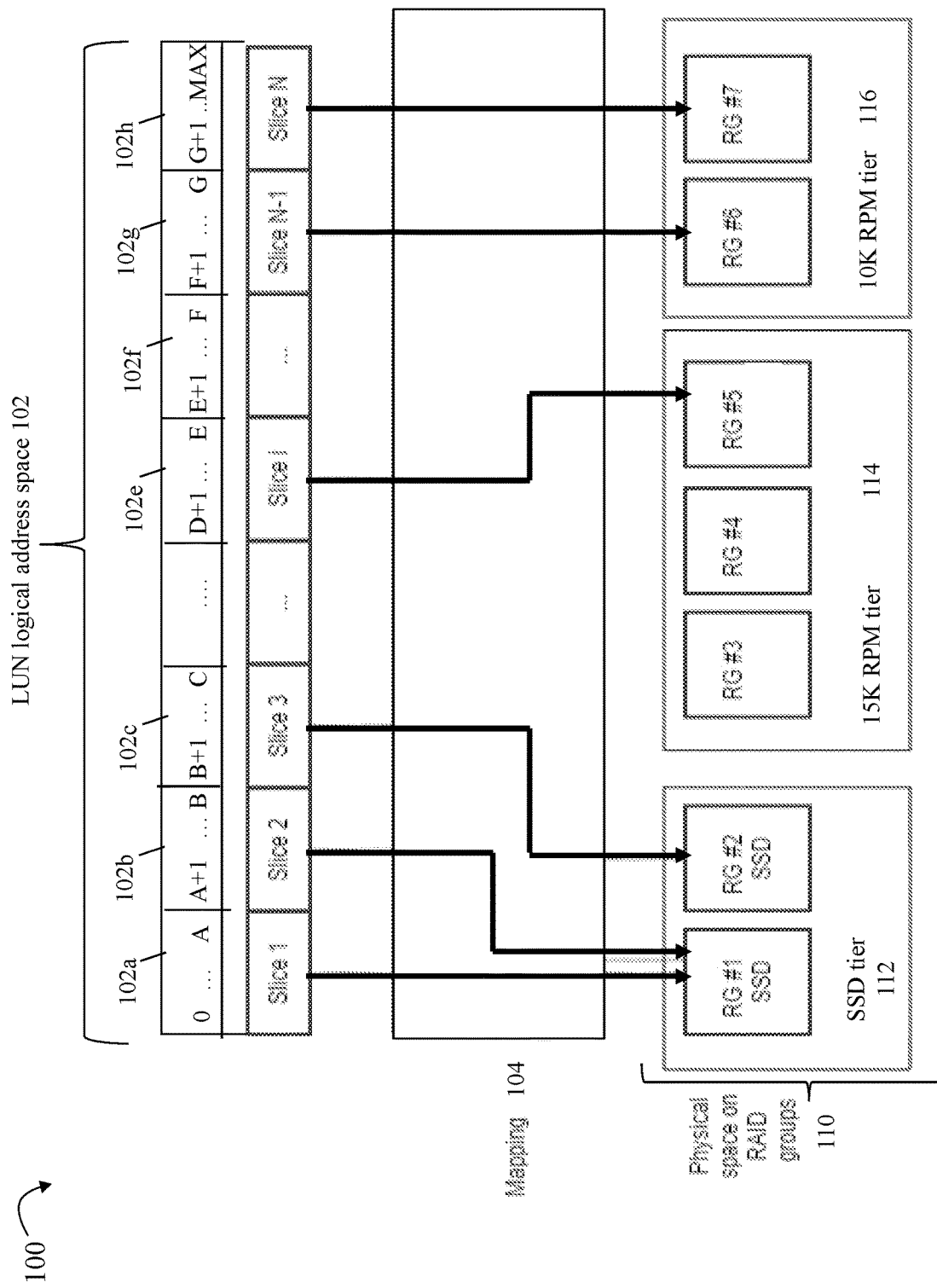
FIG. 2 is an example illustrating logical to physical mapping that may be used in an embodiment in accordance with the techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16*a-n* in FIG. 1. The example 100 include storage tiers 112 (SSD tier), 114 (15K RPM tier) and 116 (10K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102*a-h*) where each of the portions 102*a-h* is mapped to region of physical storage, also referred to as slices or segments, on the different PDs of different ones of the storage tiers of 110. As noted above, data storage system software may periodically remap portions of the LUN's logical address space to keep the most actively used or accessed portions of 102*a-n* on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In connection with user data that is written to a LUN and then stored on the PDs, or more generally, back-end non-volatile storage devices, various types of metadata (MD) may also be stored. The MD may include, for example, various structures used to access the stored user data on the PDs, attributes about the LUN, and the like. To further illustrate, the MD for a LUN may include location information identifying where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for an LBA of a LUN may include location MD identifying the physical storage location mapped to the particular LBA.

When performing various data storage services or processing I/O operations that access data stored on a LUN, data read from and/or written to a LUN may be processed using the typical I/O or data path such as described herein. For example, consistent with other discussion herein, when reading data from a LUN of the data storage system, the data may be read from the LUN, stored in the cache of the data storage system, and then further read from the cache for use by one or more other components of the data storage system. For example, data may be read from a LUN in response to a read I/O from a client, such as an external host. The data may result in a cache miss wherein the requested read data is read from a backend PD and then stored in the cache. The read data stored in the cache may then be read by another component, such as a front end component that is an HA or an FA, that returns the read data from the cache to the client that issued the read I/O operation.

In at least one embodiment, the system may have separate read and write caches for storing, respectively, only read I/O data and only write I/O data. In such an embodiment, the write cache may be implemented as a log-based write cache where write data and write I/O operations are sequentially recorded to a log-based device and then later destaged from the cache to the PDs. The destaging is performed by flushing the recorded write I/O operations from the log-based device where the recorded write I/O operations and write data are applied to the backend non-volatile PDs provisioned for use in storing the write data written to a target logical address of the write I/O operations. Once the write I/O operation and write data are written to the log-based device, successful completion of the write I/O may be sent to the client, such as a host, that originated the write I/O. The write cache may be implemented as a log in which each subsequent write I/O and write data (e.g., write I/O payload) is recorded in a next logically sequential record of the log. The log may be circular in nature in that once a write operation is recorded in the last record of the log, recording of the next write proceeds with recording in the first record of the log.

The typical I/O pattern for the log file includes logically sequential and logically contiguous writes (e.g., logically with respect to the logical offset or ordering within the log file). Data may also be read from the log file as needed (e.g., depending on the particular use or application of the log file) so typical I/O patterns may also include reads. The log file data may have a physical storage layout corresponding to the sequential and contiguous order in which the data is written to the log file. Thus, the log file data may be written to sequential and contiguous physical storage locations in a manner corresponding to the logical sequential and contiguous order of the data in the log file.

Figure 3:
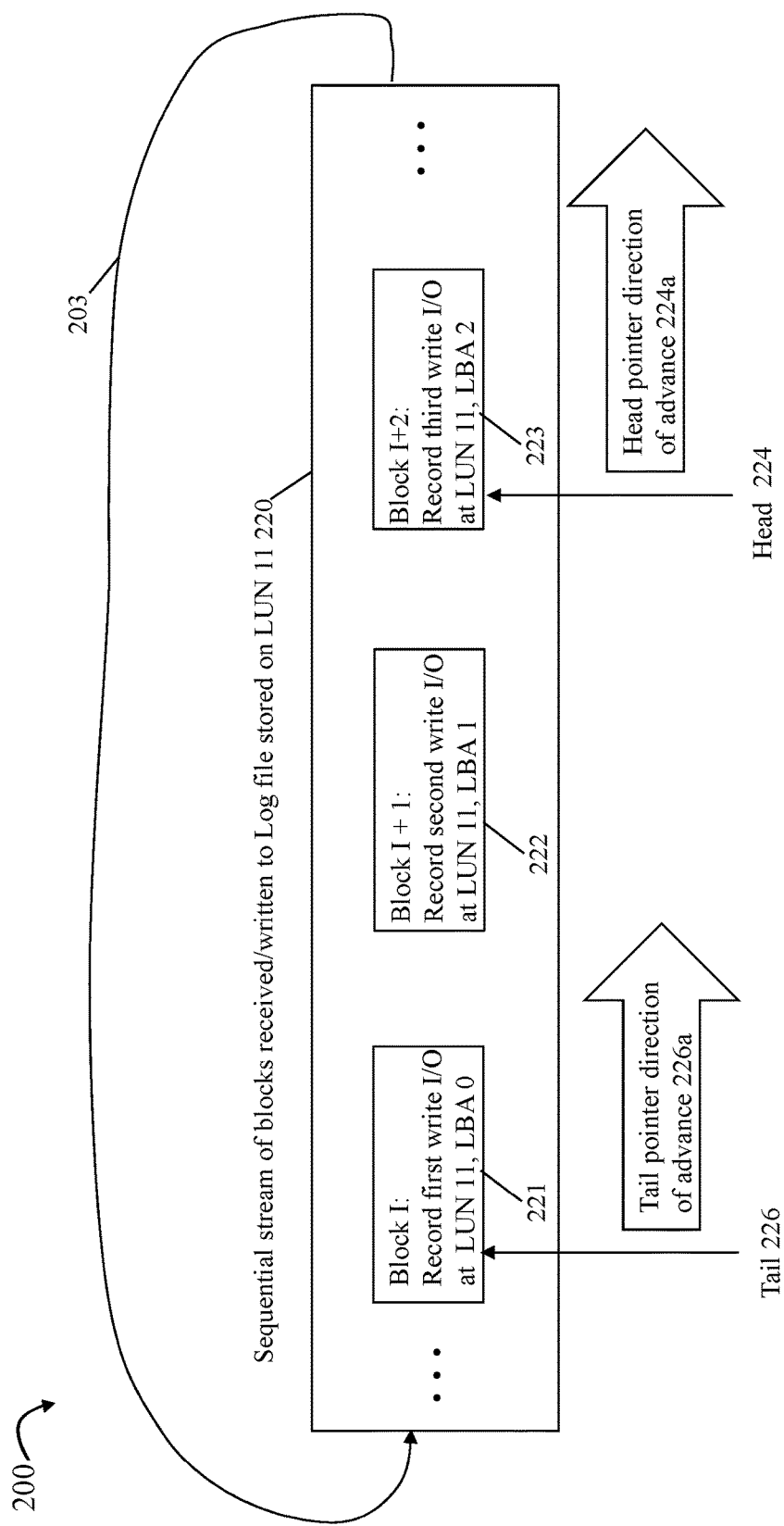
FIGS. 3 and 6 are examples illustrating log files of recorded operations that may be used in an embodiment in accordance with the techniques herein.

Referring to FIG. 3, shown is an example 200 illustrating a sequential stream 220 of blocks received that are written to the log file in an embodiment in accordance with techniques herein. In this example, the log file may be stored on LUN 11 where logged updates, such as write I/Os that write user data to a file, target LUN or other storage object, are recorded as records in the log file. Element 220 includes information or records recorded in the log file for 3 write I/Os or updates which are recorded in records or blocks I 221, I+1 222 and I+2 223 of the log file (e.g., where I denotes an integer offset of a record or logical location in the log file). The blocks I 221, I+1 222, and I+2 223 may be written sequentially in the foregoing order for processing in the data storage system. Block 221, writing to record or block I of the log file, is a write to LUN 11, LBA 0 to record or log a first write I/O operation. Block 222, writing to record or block I+1 of the log file, is a write to LUN 11, LBA 1 to record or log a second write I/O operation. Block 223, writing to record or block I+2 of the log file, is a write to LUN 11, LBA 2 to record or log a third write I/O operation. For example, assume that each of the foregoing 3 write I/O operations write to a different logical target location denoted by a target LUN and logical offset on the target LUN. The information recorded in each of the foregoing records or blocks of the log file may include the target location to which data is written and the write data written to the target location.

The head pointer 224 may denote the next free record or block of the log file used to record or log the next write I/O operation. The head pointer may be advanced 224*a* to the next record or log in the log file as each next write I/O operation is recorded. When the head pointer 224 reaches the end of the log file by writing to the last sequential block or record of the log file, the head pointer may advance 203 to the first sequential block or record of the log in a circular manner and continue processing. The tail pointer 226 may denote the next record or block of a recorded write I/O operation in the log file to be destaged and flushed from the log file. Recorded or logged write I/Os of the log file are processed and flushed whereby the recorded write I/O operation that writes to a target location (e.g., target LUN and offset) is read from the log file and then applied to a non-volatile backend PD location mapped to the target location (e.g., where the backend PD location stores the data content of the target location). Thus, as records are flushed from the log file, the tail pointer 226 may logically advance 226*a* sequentially (e.g., advance to the right toward the head pointer and toward the end of the log file) to a new tail position. Once a record or block of the log file is flushed, the record or block is freed for reuse in recording another write I/O operation. When the tail pointer reaches the end of the log file by flushing the last sequential block or record of the log file, the tail pointer may advance 203 to the first sequential block or record of the log in a circular manner and continue processing. Thus, the circular logical manner in which the records or blocks of the log file are processed form a ring buffer in which the write I/Os are recorded.

When a write I/O operation writing user data to a target location is persistently recorded and stored in the non-volatile log file, the write I/O operation is considered complete and may be acknowledged as complete to the client originating the write I/O operation to reduce the write I/O latency and response time. The write I/O operation and write data are destaged at a later point in time during a flushing process that flushes a recorded write of the log file to the backend non-volatile PDs, updates and writes any corresponding MD for the flushed write I/O operation, and frees the record or block of the log file (e.g., where the record or block logged the write I/O operation just flushed). The MD that may be updated as part of the flushing process for the target location of the write I/O operation may include location information as described above. The location information of the MD for the target location may identify the physical address or location on provisioned physical storage on a non-volatile backend PD storing the data of the target location. The target location may be, for example, a logical address on a logical device, such as a LUN and LBA on the LUN.

A data storage system may support and perform offload copy commands and operations. Generally, the offload copy operation request may be from an external data storage system client, such as a host, as well as an internal data storage system client. In at least one embodiment, the offload copy operation, sometimes also referred to herein as the Xcopy command, may be a request to perform an offload copy operation from a source to a destination or target. Such a command may request or instruct the data storage system to generally perform an offload copy command internal within the data storage system because the source and destination of the copy command are within the same data storage system. Generally, the client, such as the host, requests using the Xcopy command that the data storage system manage the copying of the data from the source to the destination. The source and destination of the Xcopy command may refer to storage objects, such as block-based addresses of logical devices. For example, the source may be a location or logical address on a source device such as a logical device, also referred to herein as a source LUN. The destination or target of the Xcopy command may be a location or logical address on a target device that is also a logical device, also referred to herein as a destination or target LUN.

The offload copy operation may provide an efficient means to copy data from a source to a destination or target within a data storage system. As an alternative, if the host does not issue an offload copy command to the data storage system, the host may first issue a read operation to the data storage system to read first data from a source location. Responsive to the read operation, the first data is returned by the data storage system to the host. Subsequently, the host issues a write operation to write the first data to the destination location. Using the offload copy operation rather than the foregoing alternative host issued read and write operations provides for more efficient use of resources of the host, data storage system and SAN or other network connecting the host and data storage system in that, for example, there is reduced network traffic (e.g., the first data is not required to be returned to the host and then sent as write operation payload data for the write operation) and the offload copy operation typically completes the request to copy the data to the destination location in less time and using less host resources as compared to the host issued read and write operations.

With the offload copy command or Xcopy command, the source location or source logical address may be mapped by source location MD to a first physical address storing the user data of the source logical address. In at least one implementation utilizing data deduplication techniques, the offload copy command may be implemented using the log file to record write operations. Subsequently, when flushing the log file, the processing may include updating the destination location MD to also map to the same first physical address also mapped by the source location MD. In such an embodiment, both the source and destination logical addresses may be mapped by location MD to the same first physical address and thus to the same single physical copy of the user data. In such an embodiment, the offload copy command may be completed by simply updating the target location MD without actually copying or duplicating any user data between physical storage locations of backend PDs.

As an alternative, an implementation may not use such data deduplication techniques and may physically copy the user data from the first physical address, that is mapped by the source location MD to the source logical address, to a second physical address, that is then mapped by the destination location MD to the target logical address. For example, with this alternative, a system may utilize the log file to log writes in connection with the offload copy command or Xcopy command. Subsequently, when flushing the log file, processing may include reading the user data from the first physical address mapped to the source logical address, and then writing the user data to the second physical storage location mapped to the destination logical address.

In an implementation like the latter one noted above without deduplication techniques (e.g., where the user data is physically duplicated or copied between different physical locations), an undesirable amount of system resources may be consumed for performing the logging and the flushing operations. Use of such resources may adversely impact I/O response time and overall data storage system performance Furthermore, since the offload copy operation may involve large amounts of data to be copied, the adverse performance impact worsens as the amount of data to be copied increases.

In the former described implementation above using deduplication techniques to implement the offload copy operation by performing destination location MD updates, there may still be an undesirable amount of time and resources used to perform the MD updates. Additionally, an acknowledgement may not be returned to the host until all such MD updates have been completed thereby resulting in added latency experienced by the host that issued the offload copy command.

With either of the foregoing implementations (e.g., using the deduplication technique and performing the MD updates or alternatively performing an actual physical data copy from the source to the destination of the Xcopy command), it may be desirable to perform further optimizations in efforts to reduce the latency and resources utilized for the Xcopy or offload copy operation.

Described in following paragraphs are techniques that may be used in connection with optimizing the Xcopy or the offload copy operation that copies data from a source location to a destination or target location within the same data storage system. In at least one embodiment, the techniques use the log file and provide for a reduction in the amount of time prior to acknowledging completion of the offload copy operation to the host. Such techniques provide for reducing or avoiding the bottleneck typically incurred when using the log file. In at least one embodiment, the techniques provide for logging or recording a special record in the log file indicating when an Xcopy command has been issued.

In at least one embodiment, the techniques may use an interval tree structure storing the source interval or source logical address range of the source location of the offload copy operation. An interval tree structure may also store the destination interval or destination logical address range of the destination location of the offload copy operation. The source intervals and the destination intervals of Xcopy commands recorded in the log file may be stored in a single interval tree structure. Alternatively, an embodiment may store the source intervals in a first interval tree structure and the destination intervals in a second interval tree structure. The one or more interval tree structures may be used in connection with processing I/O operations issued subsequent to the logged Xcopy command while the logged Xcopy command remains in the log and has not yet been flushed from the log. The one or more interval tree structures may be used in determining data dependencies between the subsequent I/O operations and the logged Xcopy command in order to maintain data consistency expected from the host or client point of view.

For a read operation issued subsequent to the logged Xcopy command while the logged Xcopy command remains in the log and has not yet been flushed from the log, processing may include examining the destination intervals to determine whether the requested read data is read from a logical address that is included in a destination interval of a logged Xcopy command. If so, the read operation may be serviced by redirecting the read to a corresponding source interval and source location of the logged Xcopy command. The redirecting may include reading requested user data from the source location and then returning the user data to the client that issued the read. Such redirecting may be performed since the Xcopy command has not yet been flushed and thus the actual on-disk physical location of the destination location has not yet been updated to include the data stored at the source location.

For a write operation issued subsequent to the logged Xcopy command while the logged Xcopy command remains in the log and has not yet been flushed from the log, processing may include examining the source intervals to determine whether the target logical address written to by the write operation is included in a source interval of a logged Xcopy command. If so, prior to writing the new data of the write operation to the target logical address, the existing data stored at the target logical address may be saved for use when flushing the logged Xcopy Command. The saved existing data is used as the particular version of the data content stored at the target logical address consistent with the point in time when the Xcopy command was issued and logged. Thus it is this particular version of the data that is to be stored in the destination location when flushing the logged Xcopy command from the log file.

The foregoing and other aspects of the techniques herein are described in more detail in the following paragraphs.

An embodiment in accordance with the techniques herein may use a log file as described herein to log or record writes and other operations that perform data modifications or updates. For example, the log file as described and illustrated in the FIG. 3 may be used. As described in more detail below, write I/O operations as well as the Xcopy command or operation may be recorded in records of the log file. The log file may be stored persistently on non-volatile memory or storage, such as in a fast non-volatile memory, such as flash-based storage or memory.

Each record of the log file may be associated with a unique LSN (logical sequence number). The LSN assigned to each record may denote a next LSN in a sequence of LSN values. In at least one embodiment, an LSN counter may be an integer counter or index that is incremented, such as by 1, each time a new write or other operation is logged in a next record of the log file. The value of the LSN counter always increases and may denote an absolute location or record number in the log file. When logging an operation in a record of the log file, the current value of the LSN counter may be assigned to the record. Subsequently the LSN counter is incremented.

Thus, each record of the log file is assigned a different LSN and is assigned the current value of the LSN. The LSN may be used to denote a sequential time ordering and position of the records in the log file. Thus each record and logged write of the log file has a unique LSN where the logged writes are applied in a write consistent order based on the increasing LSNs associated with the log records. For example, to maintain write order consistency of data, logged writes are logically applied in a sequential order based on the increasing LSNs where the log record with LSN=N is applied prior to the record with LSN=N+1. Any optimization performed, such as to flush selected log records in parallel, must maintain the same data consistency and resulting data as if the log records had been flushed and destaged in sequential order based on increasing LSNs of the log records. Consistent with other discussion herein, when flushing the log file, the space of the flushed records may be reclaimed or freed by moving the tail pointer to the flushed record with the highest LSN of all flushed records.

As discussed herein, one or more interval tree structures may be used to store the source intervals and destination intervals, respectively, included as source locations and destination locations of logged Xcopy commands. What will now be described in more detail is an example representation of an interval tree structure that may be used in an embodiment in accordance with the techniques herein. In the embodiment described herein, 2 interval trees may be used—a source interval tree (sometimes also referred to as the source tree) storing the source intervals and a destination interval tree (sometimes also referred to as the destination tree) storing the destination intervals. As will be appreciated by those skilled in the art, other variations using the same or other structures are possible. For example, a single interval tree may be used to collectively store both source and destination intervals.

Tree structures, such as interval trees, are known in the art. An interval tree is a tree data structure that hold intervals. Interval trees and how to represent intervals is described, for example, in Cormen, Thomas H.; Leiserson, Charles E.; Rivest, Ronald L.; Stein, Clifford (2009), Introduction to Algorithms (3rd ed.), MIT Press and McGraw-Hill, ISBN 978-0-262-03384-8.

In at least one embodiment, an augmented tree may be used where the augmented tree is one particular variation or implementation of an interval tree. A tree structure may generally be characterized as a hierarchical structure including levels or layer of nodes with connections between different nodes of different layers. For example, with a binary tree, each parent node at one level may include at most two child nodes at a different level. The relationship between a parent and a child node may denoted by connections between the parent and child nodes.

In at least one embodiment, the augmented tree used as the interval tree structure for storing intervals may be built from an ordered tree, such as a binary search tree or self-balancing binary search tree ordered by the low values of the intervals. An extra annotation is then added to every node recording the maximum upper value among all the intervals from of this node and its descendant nodes. Maintaining this annotation as an attribute for each node involves updating all ancestors of the node from the bottom up whenever a node is added or deleted. If there are any tree rotations during insertion and deletion, the affected nodes may need updating as well. Both insertion and deletion require O(log n) time, with n being the total number of intervals in the tree prior to the insertion or deletion operation.

Figure 4A:
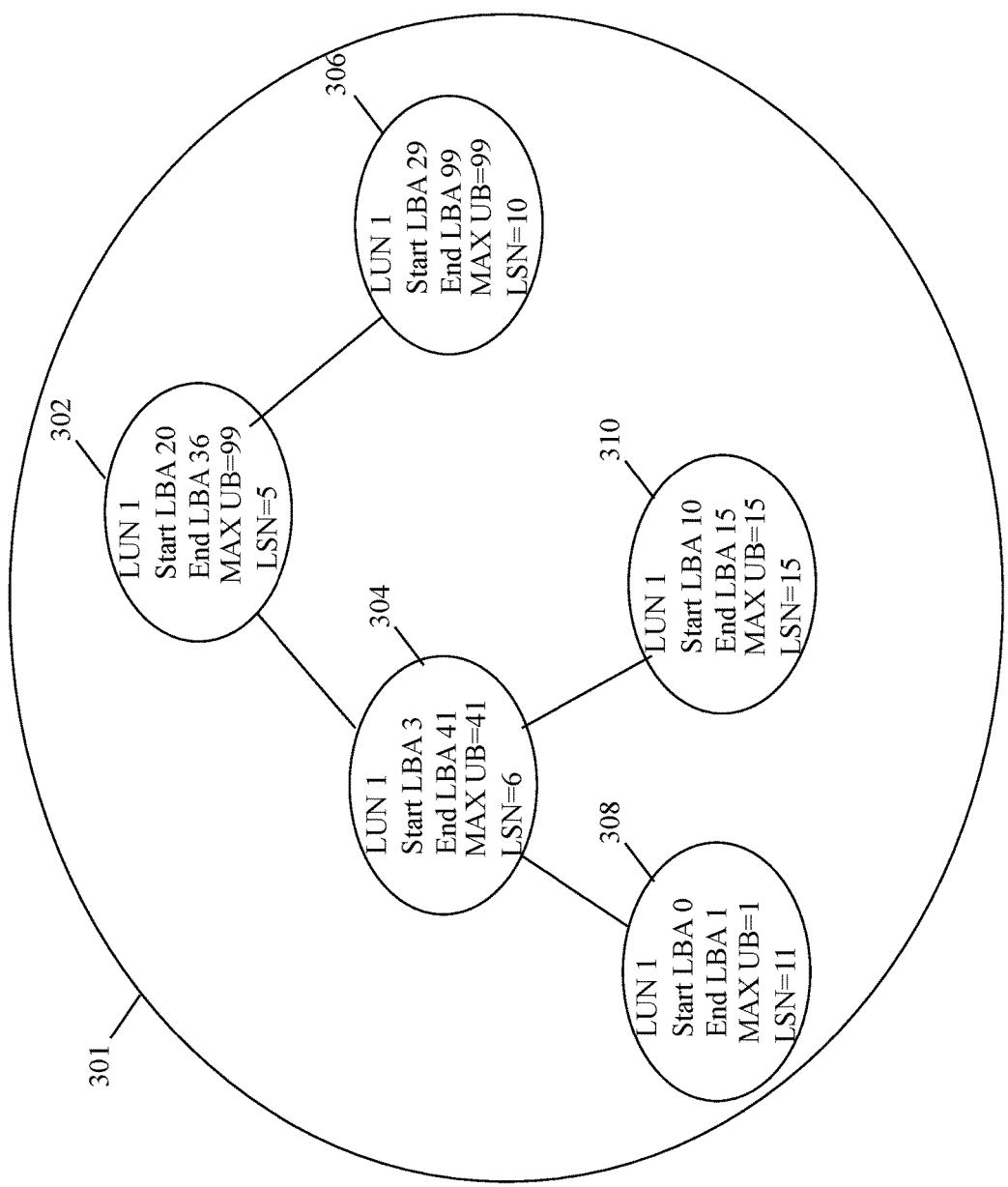
FIGS. 4A and 5 are examples illustrating interval trees that may be used in an embodiment in accordance with the techniques herein.
Figure 4B:
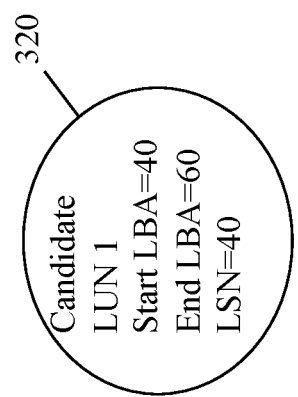
FIG. 4B illustrates a candidate node that may be used in an embodiment in accordance with the techniques herein in connection with an example described in connection with FIG. 4A.

Referring to FIGS. 4A and 4B, described in the following paragraphs is an example illustrating use of an augmented tree 301 of FIG. 4A and a candidate node 320 of FIG. 4B in an embodiment in accordance with the techniques herein. The augmented tree 301 is illustrated with 5 nodes 302, 304, 306, 308 and 310. The node 302 may also be referred to as the root node at level 1 in the tree. The nodes 304, 306 may be child nodes of the node 302 where the nodes 304 and 306 are included in level 2 of the tree. The nodes 308 and 310 are child nodes of 304 and are included in level 3 of the tree. Assume that the tree 301 includes source intervals of logged Xcopy commands. In this example, each node may include the following information:

the source LUN;

the start LBA denoting the starting LBA or lower bound of the interval represented by the node;

the end LBA denoting the ending LBA or upper bound of the interval represented by the node;

MAX UB representing the annotation described above denoting the maximum or largest value of any end LBA with respect to this node and its descendant nodes; and LSN denoting the LSN assigned to the log record of the Xcopy command including the source interval represented by this node.

It should be noted that a node of the tree 301 may also include other information, some examples of which are further described elsewhere herein.

In an augmented tree including destination intervals rather than source intervals, the tree includes similar information as described and illustrated in FIG. 4A for the source intervals with the difference that the LUN and LBAs of each node are with respect to the destination LUN and destination interval represented by the node.

To further illustrate, the node 302 represents a source location of an Xcopy command where the source LUN is LUN 1, the source interval or logical address range is 20-36 and the LSN=5 indicates that the source interval of the node is specified for a logged Xcopy command having an associated LSN of 5. Additionally, the node 302 has a MAX UB=99 which denotes that 99 is the maximum or largest value of any End LBA with respect to the node 302 and all its descendant nodes. In this case, node 306 is the only descendant node of 302 so 99 is determined as the maximum of the end LBA's of the nodes 302 and 306.

The node 304 represents a source location of an Xcopy command where the source LUN is LUN 1, the source interval or logical address range is 3-41 and the LSN=6 indicates that the source interval of the node is specified for a logged Xcopy command having an associated LSN of 6. Additionally, the node 304 has a MAX UB=41 which denotes that 41 is the maximum or largest value of any End LBA with respect to the node 304 and all its descendant nodes. In this case, nodes 308 and 310 are the descendant nodes of 302 so 41 is determined as the maximum of the end LBAs (1, 15 and 41) of the nodes 304, 308 and 310.

The tree 301 may have its nodes ordered based on the lower bound of the intervals or based on the start LBA values of the nodes. For each node, all nodes in the left subtree of the node have Start LBA values that are less than the node, and all nodes in the right subtree of the node have End LBA values that are greater than or equal to the node. The foregoing property and relationship is maintained in the tree for all nodes inserted into the tree. Thus the foregoing property and relationship between the nodes may be used in connection with searching the tree to determine whether any given candidate interval overlaps any one or more intervals represented by nodes of the tree. Additionally, the MAX UB annotation of each node may be used in connection with searching for overlapping intervals to reduce the search time.

Based on the tree 301 of FIG. 4A, two intervals A and B for the same source LUN, such as LUN 1, overlap only when both A's start LBA≤B's end LBA, and A's end LBA≥B's start LBA. When searching the trees for nodes overlapping with a given interval of a source LUN, processing may omit: all nodes to the right (e.g., in the right subtree) of a node having a start LBA that is greater than the end LBA of the given interval; and all nodes that have a MAX UB below the start LBA of the given interval.

For example, consider a given interval as illustrated by the candidate node 320 of FIG. 4B where the source LUN=LUN1 and the given interval is 40-60. Processing may be performed to determine whether the given interval 40-60 overlaps any one or more of the intervals in the tree 301 for the same source LUN 1. Processing may start at the root 302 where it is determined that the given interval 40-60 of the candidate node 320 of FIG. 4B does not overlap with the interval 20-36 represented by the root node 302 of the tree 301 of FIG. 4A. Since the root node 302 has a start LBA of 20 that is less than the given interval 320's end LBA of 60, the right subtree of the root node 302 is further searched. The right subtree of the root node 302 only includes the node 306 which does overlap with the given interval 320.

Processing may further examine the left subtree of the root node 302 of the tree 301 of FIG. 4A. The left subtree's MAX UB of 41 exceeds the start LBA (40) of the interval 40-60 of the candidate node 320 of FIG. 4B, so the left subtree of the tree 301 of FIG. 4A is also searched. However, both descendants 308, 310 of the node 304 of FIG. 4A have MAX UBs less than 40, (the start LBA of the given interval 320) so the left subtree search ends and it is not necessary to further consider the nodes 308 and 310 or any descendants of such nodes 308 and 310 of the tree 301 of FIG. 4A.

Based on the foregoing, processing may determine that the given interval represented by the node 320 of FIG. 4B overlaps with a single source interval represented by the node 306 in the tree 301 of FIG. 4A.

In an embodiment in accordance with the techniques herein, nodes of the tree 301 of FIG. 4A may generally include source intervals for multiple different source LUNs although all the nodes in the tree 301 refer to the same source LUN 1 for simplicity of illustration in this particular illustrated example. In the case where there are multiple different source LUNs having source intervals in the tree 301, processing performed to determine whether a particular candidate or given interval of the candidate 320 of FIG. 4B overlaps any intervals of the tree 301 of FIG. 4A may search for nodes of the tree 301 having a source LUN that matches the source LUN of the given interval of the candidate 320 (e.g., since overlapping intervals are determined with respect to intervals of the same LUN).

Described in more detail elsewhere herein, nodes and thus intervals are added to the source interval tree and the destination interval tree as each Xcopy command is recorded in a record of the log. Also, as also discussed elsewhere herein in more detail, nodes and thus intervals may be removed from the source interval tree and the destination interval tree as logged Xcopy commands are flushed from the log.

In at least one embodiment, each destination interval represented by a node in the destination interval tree may include the information of each node as illustrated in the FIG. 4A as well as one or more additional fields. In such an embodiment, each node of the destination interval tree may include an additional field, source node reference, that points to, or more generally references, a source node in the source interval tree. The source node, that is referenced by a destination node of the destination interval tree, represents the source interval containing the data to be copied to the destination interval of the destination node. The particular manner in which the destination node is linked to, or otherwise references, its corresponding source node by this additional field, source node reference, may be vary with embodiment. For example, each destination node of the destination interval tree may include the source node reference field that is a pointer to (e.g., contains the address of) the source node. As a variation, the destination node may include other information in the source node reference field used to identify the source node in the source interval tree. For example, the destination node may include the source LUN identifier and the start LBA that may be used to uniquely identify the corresponding source node serving as the Xcopy source for the destination node. Since it may be possible for multiple source nodes of the source interval tree to have the same source LUN and the same start LBA, the destination node may further include other information used to identify the corresponding source node such as, for example, the end LBA of the source node as well as other suitable information that may be used to identify the corresponding source node for the particular destination node.

In at least one embodiment, the source interval tree may include duplicate source nodes for the same source interval if, for example, the same source interval is used in connection with multiple logged Xcopy commands. In such an embodiment, the particular source node removed when flushing a logged Xcopy command corresponds to the particular logged Xcopy command. For example, the LSN of the logged Xcopy command should match the LSN of the removed source node.

As a variation in at least one embodiment, the source interval tree may not include duplicate source nodes for the same source interval of the same source LUN if, for example, the same source interval is used in connection with multiple Xcopy commands. Rather the source interval tree may include a single source node, and each source node of the source interval tree may include an additional field, most recent Xcopy LSN, storing the LSN of the log file record of the most recently logged Xcopy command that references the source interval. In such an embodiment, the source node is not removed from the source interval tree until the record of the most recently logged Xcopy command that references the source interval or source node is flushed from the log file (e.g., where the LSN of the flushed Xcopy record is equal to the value of the most recently logged Xcopy command as stored with the source node to be removed). Put another way, the most recent Xcopy LSN of a source node also denotes the maximum or largest LSN of all destination nodes that reference or point to the source node. Rather than use the most recent Xcopy LSN field with the source node, a counter may alternatively be associated with each source node. The counter may be used to track the number of Xcopy commands that reference the source node. When the counter of a source node only denotes a single reference and a logged Xcopy command is flushed that references (e.g., has the same LSN as) the source interval of the source node, the source node may be removed from the source interval tree.

Figure 5:
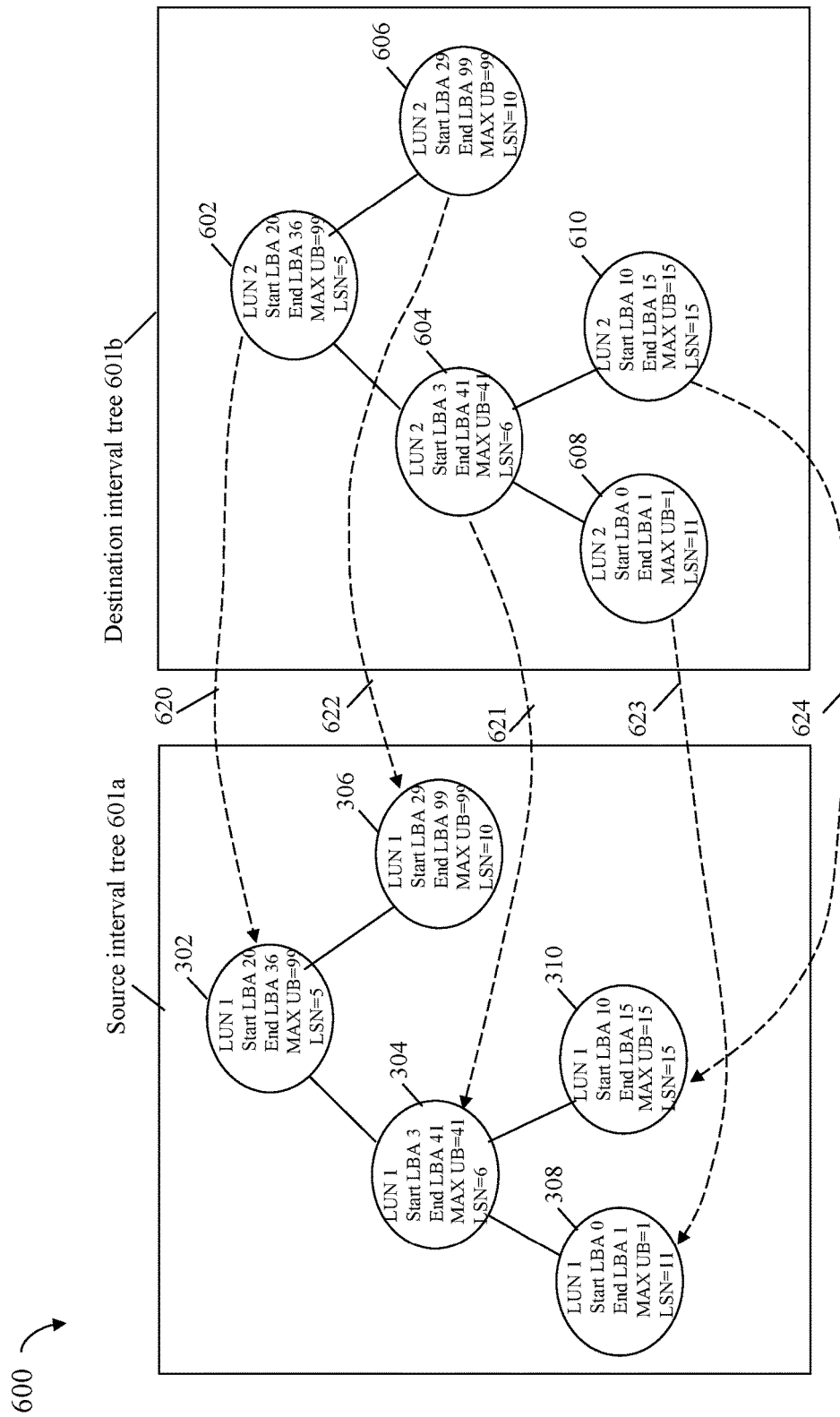

Referring to FIG. 5, shown is an example illustrating a source interval tree and a destination interval tree in an embodiment in accordance with the techniques herein. The example 600 includes the source interval tree 601a that corresponds to the source interval tree as described in FIG. 4A. Additionally, the example 600 includes a destination interval tree 601b including the nodes 602, 604 606, 608 and 610. Each of the nodes of the destination interval tree 601b specifies a destination LUN of LUN2. Thus, collectively, the state of the trees 601a and 601b correspond to having 5 logged Xcopy commands currently unflushed in the log file where each of the 5 logged Xcopy commands specifies a source LUN of LUN 1 and a destination LUN of LUN 2. For simplicity of illustration in the example 600, each of the 5 logged Xcopy commands may specify the same interval or LBA range for both the source location and the destination location. Thus, for each Xcopy command that copies data from a source location (e.g., source LUN and source interval) to a destination location (e.g., destination LUN and destination interval), a source node is inserted into the source interval tree for the source location and a destination node is inserted into the destination interval tree for the destination location.

Each destination node of the tree 601b is paired with, or references, its corresponding source node in the tree 601a where each such pair of nodes indicates, respectively, the destination and source locations or intervals of a different Xcopy command. The pairing or referencing is indicated by a dashed arrow from the destination node to the source node. The arrow 620 may denote the source node reference field of the destination node 602 that references or points to the source node 302. The arrow 621 may denote the source node reference field of the destination node 604 that references or points to the source node 304. The arrow 622 may denote the source node reference field of the destination node 606 that references or points to the source node 306. The arrow 623 may denote the source node reference field of the destination node 608 that references or points to the source node 308. The arrow 624 may denote the source node reference field of the destination node 610 that references or points to the source node 310.

As described in more detail elsewhere herein, the trees 601a and 601b may be used in connection with servicing I/O operations as part of the I/O path. In at least one embodiment, the trees 601a, 601b may be stored in volatile memory. Upon the occurrence of an unexpected system crash or other event causing the trees 601a, 601b and other contents of the volatile memory to be lost, the data storage system may be rebooted. After reboot, the trees 601a, 601b may be reconstructed, for example, from information stored in the log file where the log file is persistently stored, such as in a form of non-volatile storage or memory.

In at least one embodiment, write I/O operations and Xcopy commands or operations are recorded in the log file. Additionally, other commands or operations that may update or modify data content stored at a logical address or other location of a storage object, such as a LUN, may also be logged in the log file. Consistent with other discussion herein, an acknowledgement regarding completion of a write operation received form a client may be returned to client once the write operation has been recorded in a record of the log. The write operation may write user data to a write target location, such as at a LUN and LBA of the LUN. Consistent with other discussion herein, at a later point in time, the record from the log file is flushed whereby the write I/O operation and write data of the record are destaged to a first physical address on a backend non-volatile physical storage provisioned for the write target location. Additionally, location MD associated with the write target location may be updated to map to or identify the first physical address.

In connection with an Xcopy command received from a client such as a host, processing is performed on the data storage system. The Xcopy command may indicate to copy data from a source location to a destination location, where the source location is identified using a source LUN and a source LBA range or interval, and where the destination location is identified using a destination LUN and a destination LBA range or interval.

The processing performed for the Xcopy command may include logging a special record in the log file that identifies the Xcopy command. Additionally, the logged special record may include information identifying the source location and target location as well as the next unique LSN for the record. Once the special log record has been recorded in the log file, processing may be performed to insert a source node representing the source interval for the source location in the source interval tree and insert a destination node representing the destination interval for the destination location in the destination interval tree. The LSN for each of the inserted source and destination nodes is the LSN of the special log record created for the Xcopy command. Upon completion of creating the special record in the log file and inserting the source and destination intervals, respectively, into the source and destination interval trees, an acknowledgement regarding completion of the Xcopy command may be returned to the client that originated the Xcopy command.

Assume for purposes of illustration that the Xcopy command is a request to copy the entire LBA range from source LUN 1 to destination LUN 2, wherein both LUN 1 and LUN 2 have the same size LBA ranges, such as from 1-1000. Additionally, assume that several writes have been issued and logged prior to receiving the Xcopy command and that an additional several writes have been issued and logged subsequent to the Xcopy command. What will now be described is an example of information that may be currently stored in records of the log file.

Figure 6:
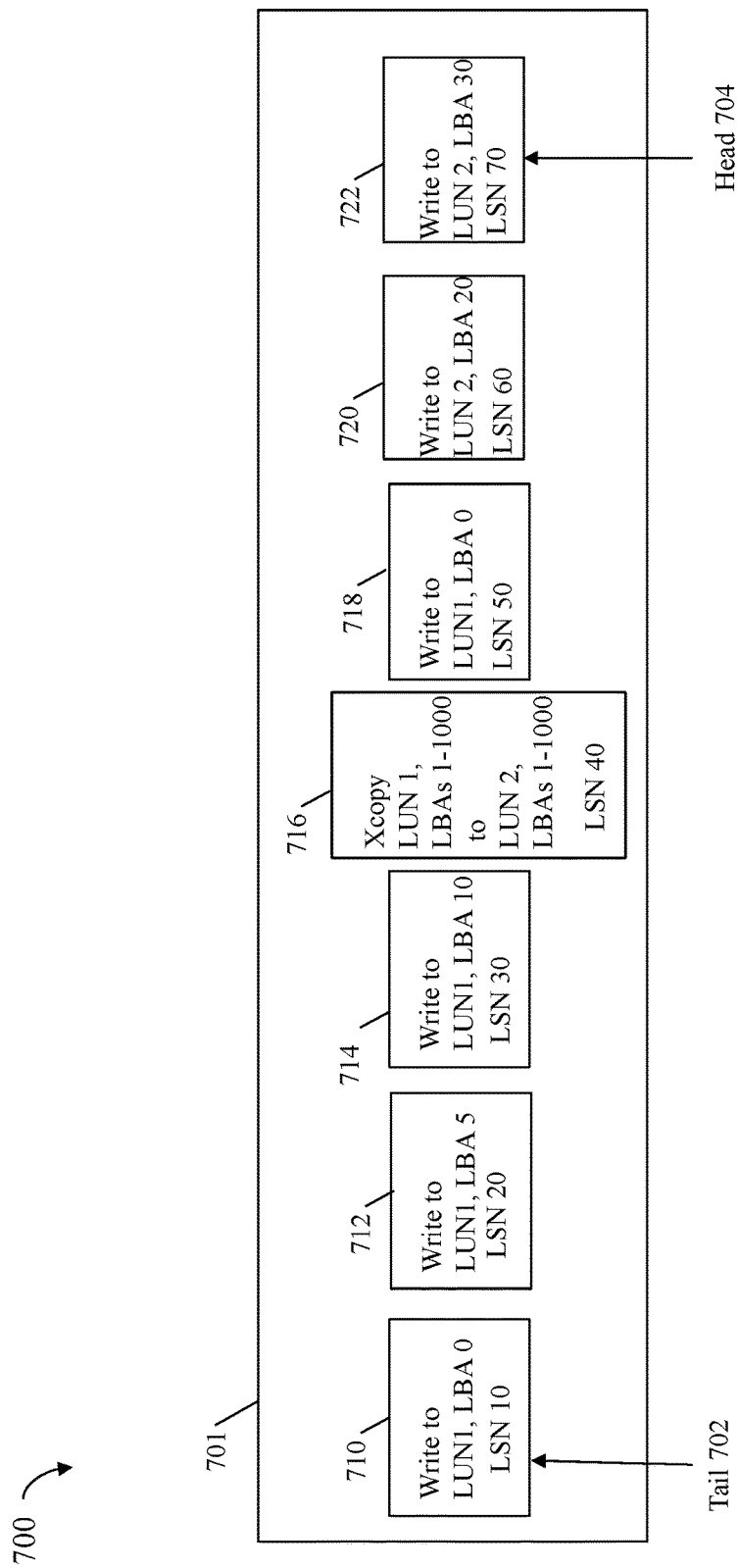

Referring to FIG. 6, shown is an example 700 of information that may be included in a log file 701 in an embodiment in accordance with the techniques herein.

The example 700 includes the head pointer 704 and the tail pointer 702. Elements 710, 712 and 714 denote 3 records of the log file 701 for 3 write I/O operations recorded in the log prior to receiving and logging the Xcopy command. Element 710 is a log record for a write to LUN 1, LBA 0 and has an LSN of 10. Element 712 is a log record for a write to LUN 1, LBA 5 and has an LSN of 20. Element 714 is a log record for a write to LUN 1, LBA 10 and has an LSN of 20. Although not explicitly included in FIG. 7, the log records 710, 712 and 714 may also record the write data (e.g., write I/O operation payload) written by the write operations. Element 716 is a log record for the Xcopy command to copy data from LUN 1, LBA 1-1000 to LUN 2, LBA 1-1000 where the record 716 has an LSN of 40.

Elements 718, 720 and 722 denote 3 records of the log file 701 for 3 write I/O operations recorded in the log after receiving and logging the Xcopy command in the record 716. Element 718 is a log record for a write to LUN 1, LBA 0 and has an LSN of 50. Element 720 is a log record for a write to LUN 2, LBA 20 and has an LSN of 60. Element 722 is a log record for a write to LUN 2, LBA 30 and has an LSN of 70. Although not explicitly included in FIG. 7, the log records 718, 720 and 722 may also record the write data (e.g., write I/O operation payload) written by the write operations.

The LSN associated with the record 716 logging the Xcopy command may be referred to as a barrier LSN. Thus, LSNs which are less than the barrier LSN are received in time prior to the Xcopy command. LSNs which are more than the barrier LSN are received in time subsequent to the Xcopy command.

In some embodiments, the log file may be flushed sequentially and in order in accordance with increasing LSN ordering. In at least one embodiment, optimizations may be performed during flushing which provide for flushing recorded writes from the log file in parallel streams. However, any flushing optimization or other optimization performed must also maintain desired data consistency. In order to maintain data consistency when flushing the log file, constraints may be placed on an order in which the records of the log file are flushed or logically applied to the stored data while still allowing any desired optimizations such as flushing logged writes in parallel. Such constraints may consider any possible data dependencies between logged writes, logged Xcopy commands and other logged operations in order to ensure write order consistency. With respect to the barrier LSN or Xcopy log record, all logged writes to the Xcopy source location occurring in time prior to the Xcopy log record are flushed prior to flushing the logged Xcopy record. Logged writes to the source location starting from the tail and up to the Xcopy log record are flushed prior to flushing the Xcopy log record. Thus, all logged writes or records having an LSN that is less than the barrier LSN are flushed prior to flushing the Xcopy record having the barrier LSN. All writes or records having an LSN that is greater than the barrier LSN are flushed after flushing the Xcopy record having the barrier LSN. Furthermore, any optimizations performed regarding the flushed log records need to maintain data consistency to have the same resultant data as if the log records were flushed sequentially in order based on increasing LSNs of the records.

With reference to FIG. 6, the records 710, 712 and 714 having, respectively, LSNs 10, 20 and 30 are flushed prior to the record 716 having the barrier LSN 40. The records 718, 720 and 722 having, respectively, the LSNs 50, 60 and 70 are flushed after the record 716 having the barrier LSN 40.

An embodiment may perform an optimization, for example, providing for flushing log records in parallel. However, consistent with other discussion herein, the optimization must ensure a flushing order that maintains write consistency. In at least one embodiment, the records 710, 712 and 714 (e.g., having LSNs 10, 20 and 30) may be flushed in parallel at a first point in time. At a second point in time subsequent to flushing and destaging the logged writes for the records 710, 712 and 714, processing may flush the Xcopy log record 716 having the barrier LSN 40. At a third point in time subsequent to flushing and destaging the Xcopy log record 716 having the barrier LSN 40, the records 718, 720 and 722 (e.g., having the LSNs 50, 60 and 70) may be flushed in parallel.

The foregoing may be performed in order to ensure data consistency. Consider a case where the foregoing ordering is not maintained and, for example, a logged write to the source having an LSN greater than the barrier LSN is flushed prior to the Xcopy log record. For example, assume that the logged write record 718 with LSN 50, which writes to the source LUN1, is flushed prior to the record 716 having the barrier LSN 40. In this case, the source LUN 1 will have logged writes applied that are inconsistent with the host's data consistency view. The target LUN 2 will also then have data content that is not synchronized with the data consistency expected at the time the Xcopy acknowledgement was sent to the host or client that sent the Xcopy command (logged with LSN=40). Thus, the LSNs associated with the log records may be used to force a logical sequential ordering in which the logged operations are expected to be applied to the data to maintain data consistency from the host or client point of view.

Any optimizations performed, such as with respect to flushing the log file, need to consider the barrier record and barrier LSN in order to maintain data consistency. Generally, optimizations of the log file or flushing of the logged writes cannot be performed across the barrier record denoting the log record of the Xcopy command. In such an embodiment, the data deduplication optimization performed with respect to the Xcopy source and target may be performed after the flushing and destaging has been completed for log records having an LSN less than the barrier LSN. For example, with data deduplication, the source logical address LUN 1, LBA 1 and the target logical address LUN 2, LBA 1 may point to the same instance of the user data stored at a physical storage location by having the location MD for both LUN 1, LBA1 and LUN 2, LBA 1 point to the same physical storage location including the user data.

The log record 716 of the Xcopy command may identify the source and destinations of the copy operation, such as the source LUN, source LBA interval, target LUN and target LBA interval. If the data storage system should crash and then be rebooted, the interval trees (stored in volatile memory) may be recovered and rebuilt by scanning the log file for the special records, the barrier records containing the barrier LSNs for logged Xcopy commands, and obtaining the source and target intervals from the barrier records, where each barrier record corresponds to a single logged Xcopy command that has not yet been flushed from the log file.

In at least one embodiment, each Xcopy command may specify a source location and a destination location. However, consistent with other discussion herein, there may be multiple Xcopy commands issued each of which specifies the same source location. As a result depending on the embodiment, the same source node or interval representing the source location may be used as a source for multiple destinations associated with the multiple Xcopy commands. In this case, a different special record, or barrier record with a barrier LSN, is created in the log for each of the Xcopy commands. However, there may be single source node in the source interval tree for the single source used in the multiple Xcopy commands. As a result, processing may be performed to ensure that a source node of the source interval tree is not removed if there is still a logged Xcopy command that references the source location and has not yet been flushed from the log. Processing may be performed that removes the source node from the source interval tree when there are no such Xcopy records of the log file that use the source location identified by the source node.

Generally, flushing a special barrier record for a logged Xcopy command may include copying the user data from the source location to the destination location in any suitable manner as described herein. For example, such copying may include physically storing a duplicate copy of the user data of the source location at the destination location. In this case, the user data stored at the source location may be read (e.g., using location MD) from a first physical storage location and stored at a second physical storage location mapped to the destination location. The location MD for the destination location may be updated to indicate that the destination location is mapped to the second physical storage location. As a variation, data deduplication techniques may be used to have both the source and destination locations map to the same copy of the user data stored at the first physical storage location. In this latter case, the processing may include updating the location MD for the destination location to indicate that the destination location is mapped to the first physical storage location.

The processing performed in connection with flushing the special barrier record for a logged Xcopy command may also include removing the destination node having the same LSN as the barrier record from the destination interval tree. Consistent with discussion herein in at least one embodiment in which there are no duplicate source nodes representing duplicates of the same source interval, processing may include removing a source node representing the source interval of the flushed barrier record if the LSN of the flushed barrier record is equal to the most recent Xcopy LSN. More generally, the foregoing source node is removed only if there are no other remaining logged Xcopy commands that reference the source node (e.g., that have the same source interval).

In at least one embodiment, the source and destination interval trees may be used in connection with servicing I/O operations that reference a logical address or location included in a logged Xcopy command source location or target location, where the I/O operations are serviced prior to flushing the logged Xcopy command from the log file.

Consider a read I/O operation received from a client that reads data from a target location. Assume the target location is expressed using a target LUN and one or more LBAs on the target LUN. Assuming there is a read cache miss for the read I/O operation. Processing of the read I/O operation as part of the I/O path may include searching the destination interval tree to determine whether the target location intersects or overlaps any existing destination interval for the target LUN stored in the destination interval tree. Such processing to determine whether an interval tree includes an existing interval or node that overlaps with a specified interval as denoted by the target location is described elsewhere herein, such as in connection with FIG. 4A.

If there is no existing node in the destination interval tree that overlaps or intersects with the target location of the read operation, normal read processing may be performed where the requested read data may be obtained from physical storage using the location MD for the target location. As discussed herein, the location MD may map the target location to its provisioned physical storage containing the user data stored at the target location.

If there is an existing destination node in the destination interval tree that overlaps or intersects with the target location of the read operation, the requested read data may be obtained using a subsequent redirected read. The redirected read may be performed by reading the requested read data from a corresponding source location or source interval. For example, assume that the read I/O operation is a request to read data from LUN 2, LBA 20. With reference back to FIG. 5, the destination interval tree 601b may be searched to determine whether there is a destination node overlapping with the target location of LUN 2, LBA 20. In this example, processing may determine that the node 602 overlaps or intersects with the target location. Processing then accesses the source node 302 referenced 620 by the matching destination node 602. A source LBA in the source interval of the node 302 is determined where the source LUN and source LBA corresponds to the target location. In particular the source LBA of the source LUN provides the data that is copied to the target location or LUN 2, LBA 2 by a logged Xcopy command referencing the source node 302 and the destination node 602. In this example the source LBA is 20. A second read request is then issued to read the data from the source LBA 20 of the source LUN 1. The data returned from the second read request is then returned to the client as the data stored at LUN 2, LBA 20. In this manner, the read operation from the client results in a redirected read to the source node. The redirected read is the second read request issued that reads the data from a corresponding source LBA in the source interval of the source node.

Consistent with discussion herein, the source node 302 is referenced 620 by the destination node 602. The particular manner in which the association 620 between the source node 302 and destination node 602 is tracked or determined may vary with embodiment. As described herein for example, the destination node may include a source node reference field that includes information used to determine the associated or referenced source node. For example, the source node reference field may be a pointer to the source node. In another embodiment where the Xcopy command includes a source location and destination location on the same LUN, the source LUN may be implied to be the same as the destination LUN of the destination node. In such an embodiment, the source node reference field of the destination node may include the start LBA of the referenced or associated source node. In yet another embodiment where the Xcopy command includes a source location with a source LUN that is different from the destination LUN of the destination location, the source node reference field of the destination node may store the source LUN identifier along with the start LBA of the source node. In this way, the corresponding source node may be located using the stored source LUN identifier and start LBA of the source node.

Consider a write I/O operation received from a client that writes first data to a target location. Assume the target location is expressed using a target LUN and one or more LBAs on the target LUN. In connection with servicing the write I/O operation as part of the I/O path, processing may include searching the source interval tree to determine whether the write target location intersects or overlaps a source interval of a source node of the source interval tree. Such processing to determine whether an interval tree includes an existing interval or node that overlaps with a specified interval as denoted by the target location is described elsewhere herein, such as in connection with FIG. 4A.

If there is an existing source node in the source interval tree that overlaps or intersects with the target location of the write operation, the existing data currently stored at the target location is saved prior to continuing with processing performed to service the write operation. The reason for saving the existing data is for a later use when flushing a logged Xcopy command from the log file where the logged Xcopy command specifies the source interval of the existing source node as the Xcopy source location. When flushing the record of the log file logging the Xcopy command that copies data from the Xcopy source location to an Xcopy destination, the existing data is needed as the version of the data content of the Xcopy source at the time the Xcopy command was issued. As part of flushing the record of the log file for the Xcopy command, the existing data is copied to the Xcopy destination. The existing data may be saved in any suitable manner. Subsequent to saving the existing data, processing of the write operation may continue.

In at least one embodiment, when servicing a read I/O operation that reads data from a target location, the log file may include logged writes to the target location and the logged writes may not yet be flushed or destaged from the log file. As a result, when performing the read, processing may be performed to return to the client the expected consistent read data reflecting application of any prior writes that are still in the log and have not yet been flushed from the log. For the read operation, processing may be performed to determine the most recently logged write, if any, that writes to the read target location. In at least one embodiment, the log file may be traversed to locate the most recently logged write that writes to the target location of a read operation. However, this may be a time consuming brute force search of the log file. As a variation, an embodiment may use a hash table or other mapping that maps the read target location (e.g., LUN, LBA) to the most recently logged write operation that writes to the read target location. In this manner, processing performed to service a read operation may include using the hash table or other structure(s) to obtain the log record of the most recently logged write operation that writes to the read target location. The processing may then return the write data of the logged write operation as the current expected value of the read target location. If there are multiple logged writes that write to the read target location, the hash table may be mapped to the record of the particular logged write having the highest LSN of all such multiple logged writes. If there is no existing entry or mapping in the hash table for the read target location, then it may be assumed that there are no logged writes that write to the read target location. In such an embodiment, the hash table or other mapping may be updated when recording write operations in the log file.

To further illustrate, reference is again made to FIG. 6. In the example 700, the log file has a log record 716 for an Xcopy command with LSN=40 where the Xcopy command may copy LUN 1, LBA 1-1000 to LUN 2, LBA 1-1000. Additionally the log file includes 2 records 720, 722 respectively logging 2 overwrites to LBAs of LUN 2 after the Xcopy command. The 2 records of the logged overwrites are: record 720 that writes to LUN 2, LBA 20 (LSN=60); and record 722 that writes to LUN 2, LBA 30 (LSN=70). After the foregoing Xcopy command and 2 writes have been logged in the log file as illustrated in the FIG. 6, a first read operation reads LUN 2, LBA 20. Rather than return the result of the redirected read to LUN 1, LBA 20 using the destination interval tree described above, the data returned should be the write data of the most recently logged write to LUN 1, LBA 20 denoted by the record 720 with LSN 60. A second read operation then received reads LUN 2, LBA 70. Since there is no subsequent overwrite to LUN 2, LBA 70 logged after the Xcopy command log record 716, the data returned for the second read operation should correspond to the contents of LUN 2, LBA 70 after applying the logged Xcopy command. In this case, the logged Xcopy command of 716 is the most recently logged write to LUN 2, LBA 70 and may be serviced by redirecting the read as described above to retrieve the read data from the Xcopy source LUN 1, LBA 70. In this case, rather than use the destination interval tree, information from the record 716 may be used to issue the redirected read that reads the data from the Xcopy source LUN 1, LBA 70. In particular, the record 716 includes the Xcopy source (e.g., LUN 1, LBAs 1-1000) and destination (e.g., LUN 2, LBAs 1-1000) information that may be used to determine the source logical address LUN 1, LBA 70 that provides the data contents for the write target address LUN 2, LBA 70. The hash table described above may be used to implement the proper mapping from a logical address to the most recent log file record that modifies the data stored at the logical address. The hash table described above may be used to obtain the current data value for the logical address. The hash table may be used to service read operations and return requested read data values in an embodiment that supports logging of overwrites such as in connection with logging an Xcopy operation and also logging one or more subsequent overwrites of logical addresses in the Xcopy destination as illustrated in the FIG. 6. Thus, to support logged overwrites to an Xcopy destination where the logged overwrites occur in the log after the logged Xcopy operation, an alternative may be used for processing reads rather than using the destination interval tree as described above. In other words, the destination interval tree and associated processing described above for reading from an Xcopy destination interval may be used when there are no subsequently logged overwrites to the destination interval. Alternatively, to support logged overwrites, the hash table or other mapping information may be used to obtain the data currently stored, for example, at LUN 2, LBA 20 when servicing the first read operation.

In at least one embodiment, processing performed to service a read operation that reads from a target location may include determining whether an existing destination node in the destination interval tree overlaps or intersects with the target location of the read operation. If so, the hash table may be used to determine the log record of the most recently logged write to the target location. If such a log record exists, a first LSN of the most recently logged write may be compared to a second LSN of the destination node. The second LSN is also the LSN of the log record of the logged Xcopy that specifies the destination interval of the destination node. If the second LSN of the destination node is larger than the first LSN, then the redirected read processing described above using the destination node may be performed to read the data of the target location by issuing another read to retrieve the read data from the Xcopy source associated with the destination node. The Xcopy source is denoted by the source node pointed to or referenced by the destination node having the second LSN. However, if the second LSN of the destination node is not larger than the first LSN of the most recently logged write to the target location of the read operation, the record of the logged write having the first LSN may be used to obtain the data written to the target location by the logged write. For example, consider the example of FIG. 6 where the read operation reads data from the target location LUN 2, LBA 20 and the log file includes the records as in the FIG. 6. In this case, processing will locate a destination node corresponding to the destination interval LUN 2, LBAs 1-1000 for the Xcopy logged in 716 having LSN 40. The destination node has an LSN of 40. The hash table may return a LSN of 60 identifying the record 720 as the most recently logged write to the target location LUN 2, LBA 20. Since the LSN of 60 (record 720) is larger than the LSN of 40 (record 716), the write data recorded in record 720 is the current data stored at LUN 2, LBA 20 and may be returned to the client as the data stored at the target location of the read operation.

An embodiment may use the techniques described herein to present to the host or other client a consistent view of the data. When an acknowledgement is sent to the host or other client acknowledging that an operation such as the Xcopy operation is completed, subsequently issued I/Os should produce a data result consistent with having completed the Xcopy operation even though the log record for the Xcopy operation has not been flushed from the log file at the time the subsequent I/Os are issued. For example, after returning and acknowledgement to the host regarding completion of the Xcopy command and without receiving further writes to the source or destinations of the Xcopy command, both the source and destination of the Xcopy have the same data. Any read I/Os from the host received after acknowledging completion of the Xcopy command should return data consistent with this view, even if the Xcopy operation has not yet been flushed from the log file.

What will now be described are flowcharts of processing steps that may be performed in an embodiment in accordance with the techniques herein. The flowcharts summarize processing described above.

Figure 7:
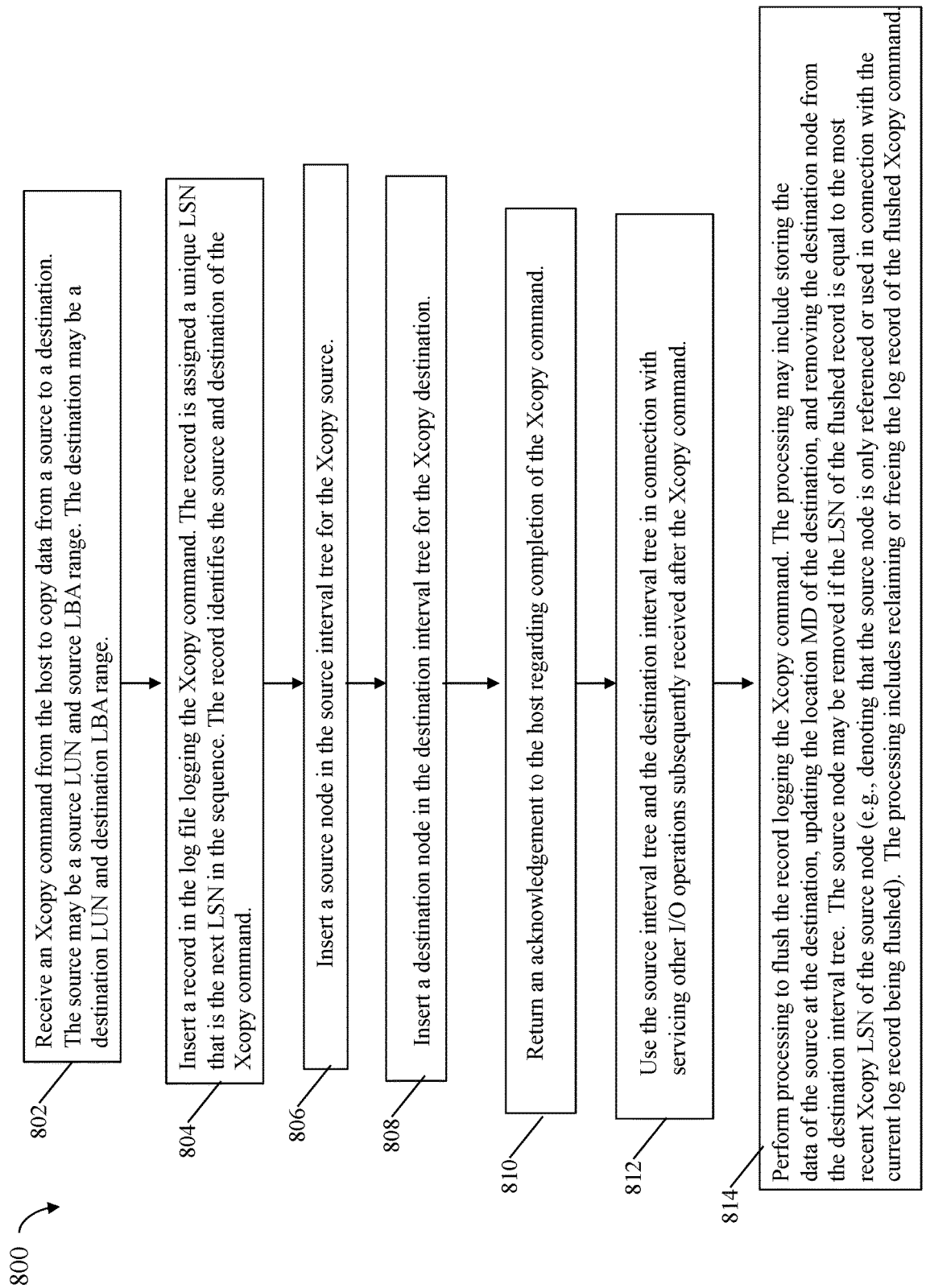
FIGS. 7, 8, 9A and 9B are flowcharts of processing steps that may be performed in an embodiment in accordance with the techniques herein.

Referring to FIG. 7, shown is a first flowchart 800 of processing steps that may be performed in an embodiment in accordance with the techniques herein.

At the step 802, an Xcopy command is received from a host to copy the data from a source to a destination. The source may be a source LUN and source LBA range. The destination may be a destination LUN and destination LBA range. From the step 802, control proceeds to the step 804.

At the step 804, processing is performed to inserts a record in the log file to log the Xcopy operation. The record is assigned a unique LSN that is the next LSN in the sequence. The record identifies the source and destination of the Xcopy command. From the step 804, control proceeds to the step 806.

At the step 806, a source node is inserted into the source interval tree for the Xcopy source. From the step 806, control proceeds to the step 808.

At the step 808, a destination node is inserted into the destination interval tree for the Xcopy destination. From the step 808, control proceeds to the step 810.

At the step 810, an acknowledgement is returned to the host regarding completion of the Xcopy command received at the step 802. From the step 810, control proceeds to the step 812.

At the step 812, the source interval tree and the destination interval tree may be used in connection with servicing other I/O operations subsequently received after the Xcopy command. From the step 812, control proceeds to the step 814.

At the step 814, processing is performed to flush the record logging the Xcopy command from the log file. The processing may include storing the data of the source at the destination, updating the location MD of the destination, and removing the destination node from the destination interval tree. The source node may be removed if the LSN of the flushed record is equal to the most recent Xcopy LSN of the source node (e.g., denoting that the source node is only referenced or used in connection with the current log record being flushed). The processing includes reclaiming or freeing the log record of the flushed Xcopy command.

Figure 8:
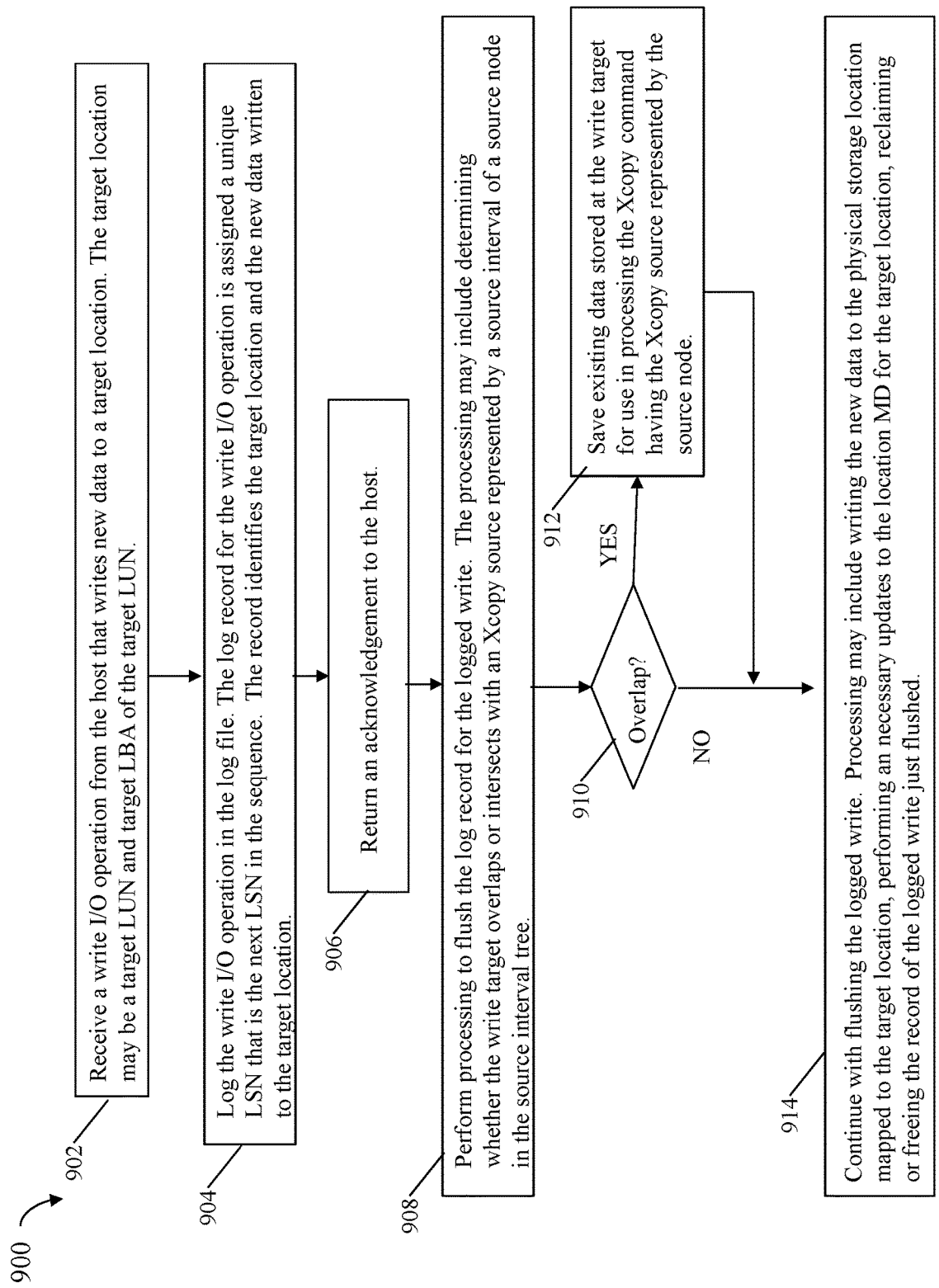

Referring to FIG. 8, shown is a second flowchart 900 of processing steps that may be performed in an embodiment in accordance with the techniques herein.

At the step 902, a write I/O operation is received from the host. The write operation writes new data to a target location. The target location may be a target LUN and target LBA of the target LUN. From the step 902, control proceeds to the step 904.

At the step 904, the write I/O operation is recorded in a record of the log file. The log record for the write I/O operation is assigned a unique LSN that is the next LSN in the sequence. The record identifies the target location and the new data written to the target location. From the step 904, control proceeds to the step 906.

At the step 906, an acknowledgment is returned to the host regarding completion of the write I/O operation. From the step 906, control proceeds to the step 908.

At the step 908 processing is performed to flush the log record for the logged write. The processing may include determining whether the write target overlaps or intersects with an Xcopy source represented by a source interval of a source node in the source interval tree. From the step 908, control proceeds to the step 910.

At the step 910, a determination is made as to whether the write target overlaps or intersects with the source interval of a source node. If the step 910 evaluates to yes, control proceeds to the step 912. At the step 912, processing is performed to save the existing data stored at the write target for use in processing the Xcopy command having the Xcopy source represented by the source node. From the step 912, control proceeds to the step 914. If the step 910 evaluates to no, control proceeds to the step 914.

At the step 914, processing is performed to continue flushing the logged write. The step 914 may include writing the new data to the physical storage location mapped to the target location, performing an necessary updates to the location MD for the target location, reclaiming or freeing the record of the logged write just flushed.

Figure 9A:
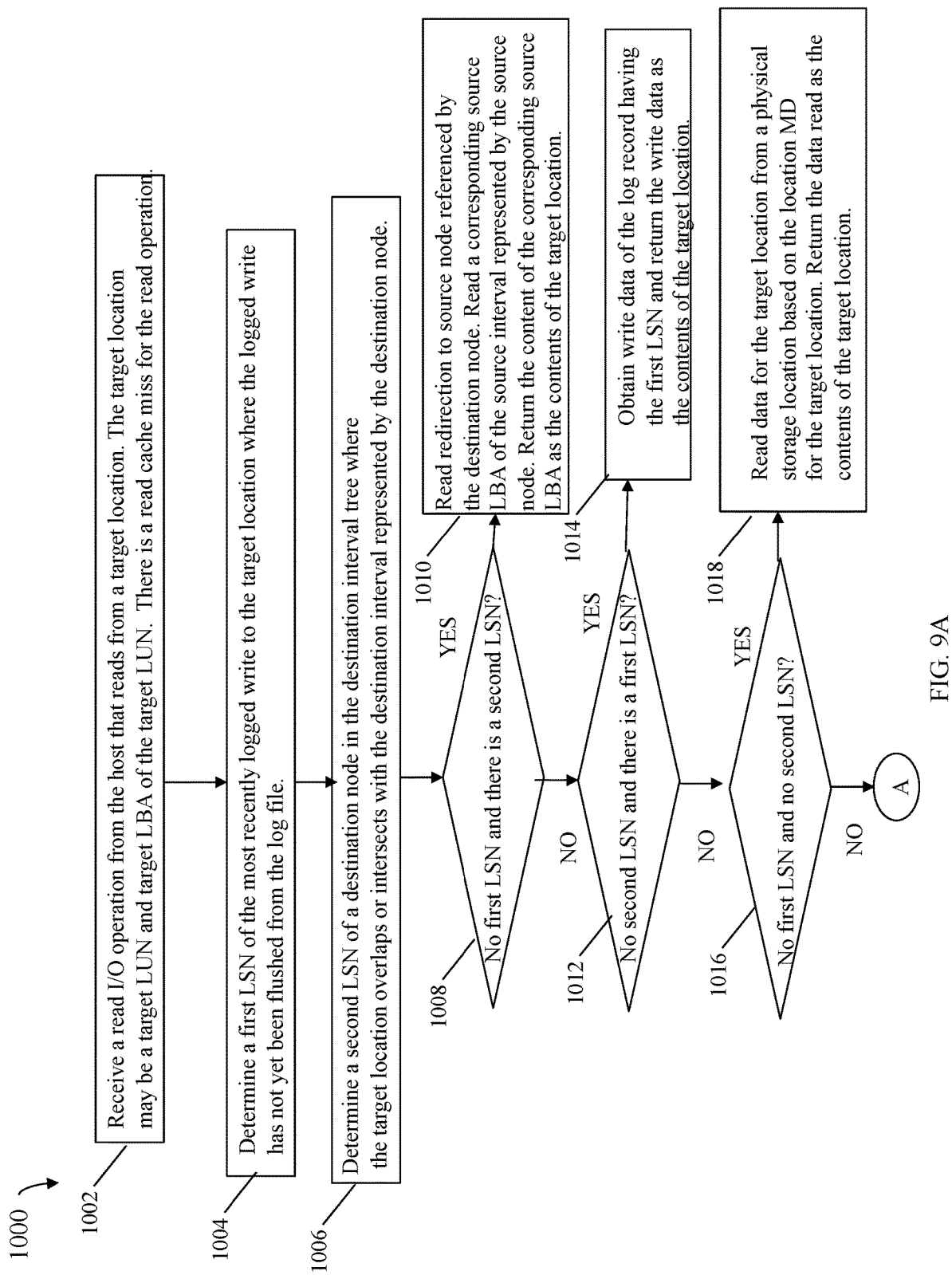
Figure 9B:
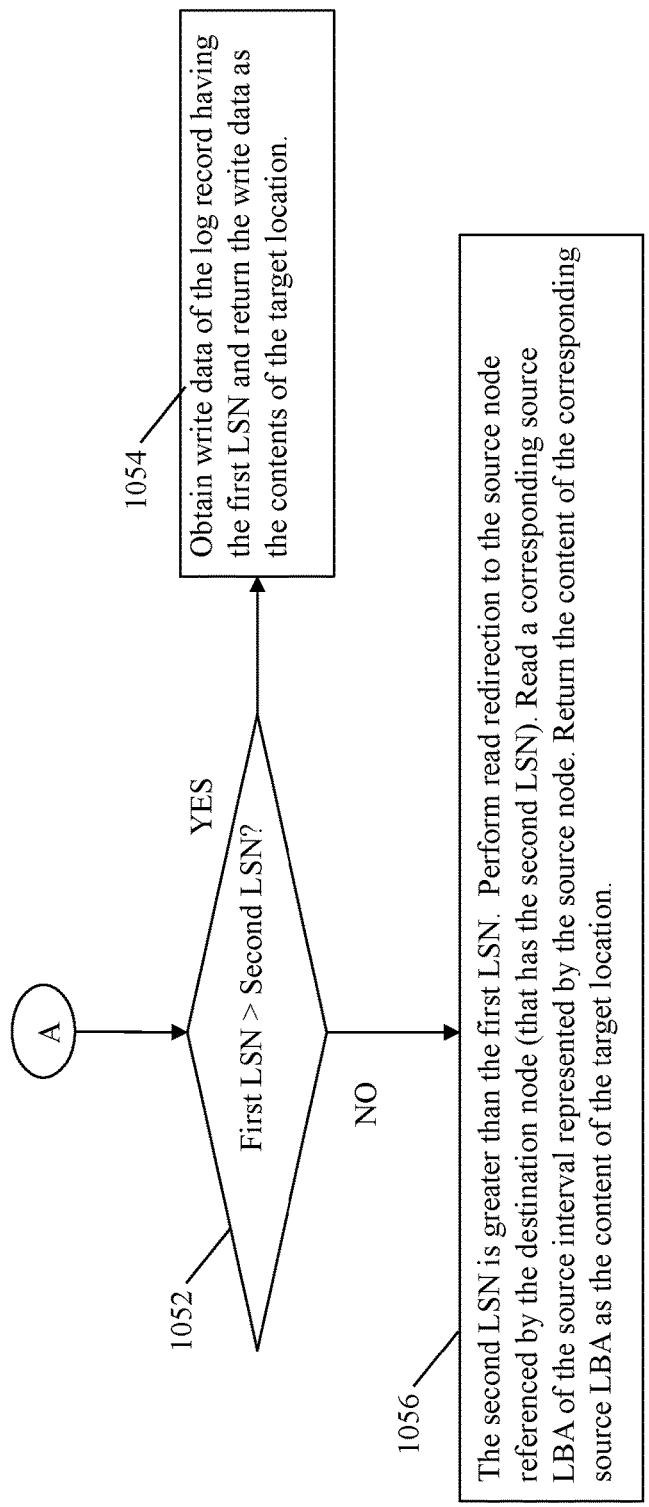

Referring to FIGS. 9A and 9B, shown is a third flowchart 1000 of processing steps that may be performed in an embodiment in accordance with the techniques herein.

At the step 1002, a read I/O operation is received from the host. The read operation reads from a target location. The target location may be a target LUN and target LBA of the target LUN. There is a read cache miss for the read operation. From the step 1002, control proceeds to the step 1004.

At the step 1004, processing is performed to determine a first LSN of the most recently logged write to the target location where the logged write has not yet been flushed from the log file. It should be noted that there may not be a first LSN if there is no such logged write. In this case, the first LSN may be null or some other invalid value denoting the non-existence of the first LSN for use in subsequent processing. From the step 1004, control proceeds to the step 1006.

At the step 1006, processing is performed to determine a second LSN of a destination node in the destination interval tree where the target location overlaps or intersects with the destination interval represented by the destination node. It should be noted that there may not be a second LSN if there is no overlapping destination node. In this case, the second LSN may be null or some other invalid value denoting the non-existence of the second LSN for use in subsequent processing. From the step 1006, control proceeds to the step 1008.

At the step 1008, a determination is made as to whether there is no first LSN but there is a second LSN. If the step 1008 evaluates to yes, control proceeds to the step 1010. At the step 1010, redirected read processing is performed to the source node referenced by the destination node. The redirected read processing reads a corresponding source LBA of the source interval represented by the source node. The content of the corresponding source LBA may be returned as the content of the target location.

If the step 1008 evaluates to no, control proceeds to the step 1012. At the step 1012, a determination is made as to whether there is no second LSN but there is a first LSN. If the step 1012 evaluates to yes, control proceeds to the step 1014. At the step 1014, the write data of the log record having the first LSN is obtained. The write data may be returned as the content of the target location.

If the step 1012 evaluates to no, control proceeds to the step 1016. At the step 1016, a determination is made as to whether there is no first LSN and also no second LSN. If the step 1016 evaluates to yes, control proceeds to the step 1018. At the step 1018, processing is performed to read data for the target location from a physical storage location based on the location MD for the target location. The data read from the physical storage location is returned as the content of the target location.

If the step 1016 evaluates to no, control proceeds to the step 1052. At this point in processing, both the first LSN and the second LSN exist indicating that there is a logged write to the target location that has not yet been flushed from the log and that there is a destination node that overlaps or intersects with the target location. At the step 1052, a determination is made as to whether the first LSN is greater than the second LSN. If the step 1052 evaluates to yes, control proceeds to the step 1054. At the step 1054, processing is performed to obtain the write data of the log record having the first LSN and return the write data as the content of the target location.

If the step 1052 evaluates to no, control proceeds to the step 1056. At this point at the step 1056, it is known that the second LSN is greater than the first LSN. At the step 1056, redirected read processing is performed to the source node referenced by the destination node (where destination node has the second LSN). The redirected read processing reads a corresponding source LBA of the source interval represented by the source node. The content of the corresponding source LBA may be returned as the content of the target location.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing operations comprising:
    receiving, at a data storage system from a host, a first operation that is a request to perform a first offload copy operation internally within the data storage system, wherein the first operation indicates that the offload copy operation copies data from a first source interval to a first destination interval, wherein the first source interval is a source logical device and a source range of one or more logical address on the source logical device, and wherein the first destination interval is a destination logical device and a destination interval of one or more logical address on the destination logical device;
    inserting a first record in a log file logging the first offload copy operation;
    inserting a first source node representing the first source interval in a source interval tree, wherein each node in the source interval tree represents a source interval of an offload copy operation having a corresponding record in the log file;
    inserting a first destination node representing the first destination interval in a destination interval tree, wherein each node in the destination interval tree represents a destination interval of an offload copy operation having a corresponding record in the log file;
    returning an acknowledgement to the host regarding completion of the first offload copy operation; and
    flushing the first record of the log file, wherein said flushing includes:
        copying data from the first source interval to the first destination interval;

updating first location metadata for the first destination interval; and removing the first destination node from the destination interval tree.

2. The method of claim 1, wherein updating the first location metadata for the first destination interval includes updating first mapping information that maps the first destination interval to one or more physical storage locations and wherein second location metadata for the first source interval includes second mapping information that maps the first source interval to the one or more physical storage locations also currently mapped to the first destination interval.

3. The method of claim 1, wherein said flushing the first record of the log file includes: removing the first source node from the source interval tree if the first source node is not referenced by any destination node other than the first destination node.

4. The method of claim 1, wherein said flushing the first record of the log file includes:
reclaiming the first record of the log file for reuse in logging other operations in the log file.

5. The method of claim 1, wherein the log file is stored in non-volatile memory.

6. The method of claim 1, wherein the source interval tree and the destination interval tree are stored in volatile memory.

7. The method of claim 1, further comprising:
receiving, from a client, a write I/O operation that writes first data to a first target location;
inserting a second record in the log file logging the write I/O operation;
return a second acknowledgement to the client indicating completion of the write I/O operation; and
performing first processing to flush the second record from the log file, the first processing including:
determining whether the first target location overlaps with a particular source interval of a particular source node of the source interval tree; and
responsive to determining the first target location overlaps with the particular source interval of the particular source node of the source interval tree, performing processing to save existing data currently stored at the first target location prior to overwriting the existing data of the first target location with the first data.

8. The method of claim 7, wherein the first processing to flush the second record includes:
reclaiming the second record of the log file for reuse in logging other operations in the log file.

9. The method of claim 1, further comprising:
receiving, from a client, a read I/O operation that reads from a first target location;
determining that the first target location overlaps with a second destination interval of a second destination node of the destination interval tree; and
responsive to determining that the first target location overlaps with the second destination interval of the second destination node of the destination interval tree, performing processing including:
obtaining a second source node of the source interval tree wherein the second source node is referenced by the second destination node;
determining, using the second source node, a corresponding source location in a second source interval represented by the second source node;
issuing a read to read current data stored at the corresponding source location; and
returning, to the client in response to the read I/O operation, the current data indicating that the current data is stored at the first target location.

10. The method of claim 1, further comprising:
receiving, from a client, a read I/O operation that reads from a first target location;
determining that the first target location overlaps with a second destination interval of a second destination node of the destination interval tree, wherein the second destination node has a first sequence number;
determining that a second record of the log file logs a write I/O operation that writes first data to the first target location, wherein the second record of the log file has a second sequence number; and
responsive to determining the first sequence number is less than the second sequence number, obtaining the first data from the second record of the log file and returning the first data to the client in response to the read I/O operation.

11. The method of claim 10, further comprising:
responsive to determining the first sequence number is not less than the second sequence number, performing processing including:
obtaining a second source node of the source interval tree wherein the second source node is referenced by the second destination node;
determining, using the second source node, a corresponding source location in a second source interval represented by the second source node;
issuing a read to read current data stored at the corresponding source location; and
returning, to the client in response to the read I/O operation, the current data indicating that the current data is stored at the first target location.

12. The method of claim 1, wherein each record of the log file is associated with a unique sequence number and wherein an increasing ordering of the unique sequence numbers of the records of the log file indicates the logical order in which writes logged in the records applied to maintain write data consistency of data modified by the records of the log file.

13. The method of claim 12, wherein a first sequence number is associated with the first record of the log file logging the first offload copy operation.

14. The method of claim 13, further comprising:
prior to flushing the first record of the log file, flushing each record of the log file having an associated sequence number less that the first sequence number.

15. The method of claim 14, further comprising:
subsequent to flushing the first record of the log file, flushing each record of the log file have an associated sequence number greater than the first sequence number.

16. A system comprising:
one or more processors; and
a memory comprising code stored thereon that, when executed, performs a method of processing operations comprising:
receiving, at a data storage system from a host, a first operation that is a request to perform a first offload copy operation internally within the data storage system, wherein the first operation indicates that the offload copy operation copies data from a first source interval to a first destination interval, wherein the first source interval is a source logical device and a source range of one or more logical address on the source logical device, and wherein the first destination interval is a destination logical device and a destination interval of one or more logical address on the destination logical device;

inserting a first record in a log file logging the first offload copy operation;

inserting a first source node representing the first source interval in a source interval tree, wherein each node in the source interval tree represents a source interval of an offload copy operation having a corresponding record in the log file;

inserting a first destination node representing the first destination interval in a destination interval tree, wherein each node in the destination interval tree represents a destination interval of an offload copy operation having a corresponding record in the log file;

returning an acknowledgement to the host regarding completion of the first offload copy operation; and flushing the first record of the log file, wherein said flushing includes:
  copying data from the first source interval to the first destination interval;
  updating first location metadata for the first destination interval; and
  removing the first destination node from the destination interval tree.

17. A non-transitory computer readable medium comprising code stored thereon that, when executed, performs a method of processing operations comprising:

receiving, at a data storage system from a host, a first operation that is a request to perform a first offload copy operation internally within the data storage system, wherein the first operation indicates that the offload copy operation copies data from a first source interval to a first destination interval, wherein the first source interval is a source logical device and a source range of one or more logical address on the source logical device, and wherein the first destination interval is a destination logical device and a destination interval of one or more logical address on the destination logical device;

inserting a first record in a log file logging the first offload copy operation;

inserting a first source node representing the first source interval in a source interval tree, wherein each node in the source interval tree represents a source interval of an offload copy operation having a corresponding record in the log file;

inserting a first destination node representing the first destination interval in a destination interval tree, wherein each node in the destination interval tree represents a destination interval of an offload copy operation having a corresponding record in the log file;

returning an acknowledgement to the host regarding completion of the first offload copy operation; and flushing the first record of the log file, wherein said flushing includes:
  copying data from the first source interval to the first destination interval;
  updating first location metadata for the first destination interval; and
  removing the first destination node from the destination interval tree.

* * * * *